United States Patent
Li et al.

(10) Patent No.: US 11,705,039 B2
(45) Date of Patent: Jul. 18, 2023

(54) AMBIENT LIGHT AND PROXIMITY DETECTION METHOD, PHOTOGRAPHING METHOD, AND TERMINAL

(71) Applicant: Honor Device Co., Ltd., Guangdong (CN)

(72) Inventors: Chenlong Li, Shenzhen (CN); Hongxia Gui, Shenzhen (CN); Xin Zhao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/678,330

(22) Filed: Feb. 23, 2022

(65) Prior Publication Data

US 2022/0180789 A1    Jun. 9, 2022

Related U.S. Application Data

(63) Continuation of application No. 16/959,059, filed as application No. PCT/CN2018/099932 on Aug. 10, 2018, now Pat. No. 11,295,653.

(30) Foreign Application Priority Data

Dec. 29, 2017    (WO) ................ PCT/CN2017/120319

(51) Int. Cl.
  *G09G 5/10*     (2006.01)
  *G09G 3/20*     (2006.01)
(52) U.S. Cl.
  CPC ................. *G09G 3/20* (2013.01); *G09G 5/10* (2013.01); *G09G 2360/144* (2013.01)
(58) Field of Classification Search
  CPC ...... G09G 3/20; G09G 5/10; G09G 2360/144; G06F 1/1637; H04M 1/0266; H04M 1/72454; H04M 1/026; H04M 2250/12
  See application file for complete search history.

(56) References Cited

U.S. PATENT DOCUMENTS

| | | |
|---|---|---|
| 5,844,540 A | 12/1998 | Terasaki |
| 9,557,475 B2 | 1/2017 | Kim |

(Continued)

FOREIGN PATENT DOCUMENTS

| | | |
|---|---|---|
| CN | 101162416 A | 4/2008 |
| CN | 101889304 A | 11/2010 |

(Continued)

OTHER PUBLICATIONS

"Pseudo-CR on Usage report for offline charging over Sx interface," 3GPP TSG CT4 Meeting #75bis, Spokane, US, C4-170130, total 15 pages, 3rd Generation Partnership Project, Valbonne, France (Jan. 16-20, 2017).

(Continued)

*Primary Examiner* — Rodney Amadiz

(74) *Attorney, Agent, or Firm* — Leydig, Voit & Mayer, Ltd.

(57) ABSTRACT

This application relates to the field of communications technologies, and provides ambient light and optical proximity detection methods, a photographing method, and a terminal, so that an entire display screen of the terminal is used to display a user interface, and this improves user experience. The method specifically includes: controlling, by a terminal, some areas of a display screen to display a black picture for a plurality of times; and when the areas display the black picture, obtaining an intensity of ambient light detected by an ambient light sensor to adjust luminance of the display screen.

20 Claims, 26 Drawing Sheets

(56) References Cited

U.S. PATENT DOCUMENTS

| | | | |
|---|---|---|---|
| 11,295,653 B2* | 4/2022 | Li | G06F 1/1637 |
| 2002/0049933 A1 | 4/2002 | Nyu | |
| 2007/0279369 A1 | 12/2007 | Yao et al. | |
| 2014/0132158 A1 | 5/2014 | Land et al. | |
| 2014/0267349 A1 | 9/2014 | Lee | |
| 2016/0035285 A1 | 2/2016 | Jung | |
| 2016/0063919 A1 | 3/2016 | Ha et al. | |
| 2017/0221450 A1 | 8/2017 | Kim et al. | |
| 2018/0274974 A1 | 9/2018 | Wang | |

FOREIGN PATENT DOCUMENTS

| | | |
|---|---|---|
| CN | 104765422 A | 7/2015 |
| CN | 102625944 B | 10/2015 |
| CN | 104978919 A | 10/2015 |
| CN | 106033666 A | 10/2016 |
| CN | 106303023 A | 1/2017 |
| CN | 106462339 A | 2/2017 |
| CN | 106878564 A | 6/2017 |
| CN | 107330415 A | 11/2017 |
| CN | 107426428 A | 12/2017 |
| CN | 107436658 A | 12/2017 |
| WO | 2017054108 A1 | 4/2017 |

OTHER PUBLICATIONS

"Pseudo-CR on Linked usage reports over Sx," 3GPP TSG CT4 Meeting #76, Dubrovnik, Croatia, C4-171371, total 1 page, 3rd Generation Partnership Project, Valbonne, France (Feb. 13-17, 2017).

"3rd Generation Partnership Project; Technical Specification Group Core Network and Terminals; Interface between the Control Plane and the User Plane Nodes; Stage 3 (Release 15)," 3GPP TS 29.244 V15.0.0, pp. 1-157, 3rd Generation Partnership Project, Valbonne, France (Dec. 2017).

"3rd Generation Partnership Project; Technical Specification Group Services and System Aspects; Architecture enhancements for control and user plane separation of EPC nodes; Stage 2 (Release 15)," 3GPP TS 23.214 V15.1.0, pp. 1-84, 3rd Generation Partnership Project, Valbonne, France (Dec. 2017).

"3rd Generation Partnership Project; Technical Specification Group Services and System Aspects; Telecommunication management; Charging management; Packet Switched (PS) domain charging (Release 15)," 3GPP TS 32.251 V15.0.0, pp. 1-186, 3rd Generation Partnership Project, Valbonne, France (Sep. 2017).

* cited by examiner

Front view of a mobile phone

Cross-sectional view of a mobile phone

Front view of a mobile phone

Front view of a mobile phone

Front view of a mobile phone

Front view of a mobile phone

Front view of a mobile phone

Front view of a mobile phone

1

AMBIENT LIGHT AND PROXIMITY DETECTION METHOD, PHOTOGRAPHING METHOD, AND TERMINAL

This application is a continuation of U.S. application Ser. No. 16/959,059, filed on Jun. 29, 2020, which is a national stage of International Application No. PCT/CN2018/099932, filed on Aug. 10, 2018, which claims priority to International Application No. PCT/CN2017/120319, filed on Dec. 29, 2017. All of the aforementioned applications are hereby incorporated by reference in their entireties.

TECHNICAL FIELD

This application relates to the field of communications technologies, and in particular, to ambient light and proximity detection methods, a photographing method, and a terminal.

BACKGROUND

When a user uses a mobile phone, there are naturally ambient light sources such as natural light and lamp light. The ambient light sources of the mobile phone affect a display effect of a display screen of the mobile phone. To improve the display effect of the display screen of the mobile phone, the mobile phone needs to detect ambient light, and adjust display luminance of the display screen of the mobile phone based on a detection result.

Currently, ambient light may be detected by using an ambient light sensor installed on the display screen. However, a specific field of view (FOV) is required during detection by the ambient light sensor, and therefore a part that is of the display screen and that is located in an FOV area of the ambient light sensor cannot be used to display a picture. This affects user experience. In addition, an optical proximity sensor and a front-facing camera of the mobile phone also need to be located below a non-display area of the display screen. Therefore, disposing these components reduces a screen-to-body ratio of the mobile phone.

SUMMARY

Embodiments of this application provide ambient light and proximity detection methods, a photographing method, and a terminal, so that an entire display screen of the terminal is used to display a user interface, and this improves user experience.

According to a first aspect, an embodiment of this application provides an ambient light detection method, and the method is applied to a terminal. The terminal includes a display screen and a first ambient light sensor. The first ambient light sensor is located under the display screen. A display area of the display screen includes a first area and a second area. The first area includes an area used by the first ambient light sensor to receive ambient light, and the second area is at least a part of an area, other than the first area, in the display area. The method includes: controlling, by the terminal, the first area to display a black picture for at least two times; controlling, by the terminal when the first area displays the black picture, the second area to display an image frame picture; controlling, by the terminal, the first area to display the image frame picture in an interval between consecutively displaying the black picture in the first area for two times; and when the first area displays the black picture, obtaining, by the terminal, an intensity of the ambient light detected by the first ambient light sensor.

It should be noted that the terminal may be set, by default, to automatically adjust luminance of the screen based on the ambient light. Alternatively, the terminal may provide a setting option for a user to choose whether to enable a function of automatically adjusting luminance of the screen based on the ambient light. If the automatic ambient light-based adjustment function is disabled on the terminal, when the terminal works in a screen-on state, the terminal displays various user interfaces or content in all display areas of the display screen according to the prior art. If the automatic ambient light-based adjustment function is enabled on the terminal, when the terminal works in a screen-on state, the terminal displays by using the solution provided in this embodiment, so that the ambient light sensor can detect the ambient light, and the terminal displays various user interfaces or content in all display areas of the display screen. In other words, regardless of whether the user enables the automatic ambient light-based adjustment function, the user can view an entire display user interface in all the display areas of the display screen. In this way, disposing the ambient light sensor under the display screen does not affect a display effect, and the automatic ambient light-based adjustment function can be implemented.

The terminal controls the first area of the display screen to display the black picture for a plurality of times. When the first area displays the black pictures, the terminal obtains the intensity of the ambient light detected by the ambient light sensor, and automatically adjusts luminance of the display screen based on the detected intensity of the ambient light. This improves user experience. In addition, the terminal controls the first area to display the image frame picture in the interval between consecutively displaying the black picture in the first area for two times, so that the entire display screen of the terminal can be used to display the image frame picture. This improves user experience.

In a possible design, after the obtaining, by the terminal, an intensity of the ambient light detected by the first ambient light sensor, the method further includes: automatically adjusting, by the terminal, luminance of the display screen based on the intensity of the ambient light detected by the first ambient light sensor.

It should be noted that, in this embodiment of this application, the first area of the display screen displays the black picture for the plurality of times, so that the terminal can obtain one or more ambient light detection results in a process of refreshing one frame of picture. The terminal may automatically adjust the luminance of the display screen based on each ambient light detection result. Alternatively, after performing averaging, obtaining a median value, or performing other processing on the plurality of ambient light detection results within a time period, the terminal may automatically adjust the luminance of the display screen based on a processing result. A method for adjusting the luminance of the display screen by the terminal based on the ambient light detection result is not limited in this embodiment of this application.

In a possible design, when the terminal runs a first-type application, the terminal increases the interval between consecutively displaying the black picture in the first area for any two times. Alternatively, when the terminal runs a first-type application, the terminal controls the first area to always display the image frame picture, and disables the ambient light-based adjustment function.

Optionally, the terminal may alternatively determine, based on a currently running application, whether to automatically enable or disable the automatic ambient light-based adjustment function. For example, when the terminal runs the first-type application, the terminal may automatically disable the ambient light-based adjustment function. Specifically, ambient light-based adjustment does not need to be performed. Therefore, the terminal does not need to perform ambient light detection or obtain ambient light detection data, and the terminal may always control the display screen to perform normal display without displaying the black picture. Optionally, the terminal may determine, based on the currently running application, whether to decrease a frequency of automatic ambient light-based adjustment. For example, when the terminal runs the first-type application, the terminal may automatically increase the interval between consecutively displaying the black picture in the first area for any two times. In other words, the terminal may decrease a frequency of displaying the black picture, a frequency of obtaining the intensity of the ambient light, and a frequency of adjusting the luminance of the screen. Disabling the ambient light-based adjustment function or decreasing the frequency of ambient-based light adjustment can improve stability of displaying a picture by the terminal. This improves user experience. The first-type application may be an application that has a relatively high requirement for picture stability, for example, may be a video application, a game application, or a reading application. When the terminal switches from running the first-type application to running a non-first-type application, the terminal may automatically enable the ambient light-based adjustment function, or automatically increase the frequency of ambient light-based adjustment, for example, automatically decrease the interval between consecutively displaying the black picture in the first area for any two times, or increase the interval to a default value.

In a possible design, when an obtained movement speed of the terminal is greater than a preset threshold, the terminal increases the interval between consecutively displaying the black picture in the first area for any two times. Alternatively, when an obtained movement speed of the terminal is greater than a preset threshold, the terminal controls the first area to always display the image frame picture, and disables the ambient light-based adjustment function.

Optionally, the terminal may alternatively obtain the movement speed of the terminal. When the obtained movement speed of the terminal is greater than the preset threshold, the terminal may consider that the user is running, taking a vehicle, or the like, and the user may not want to view the display screen of the terminal or does not expect the luminance of the screen to change greatly, and may automatically disable the ambient light-based adjustment function or decrease the frequency of automatic ambient light-based adjustment. When the obtained movement speed of the terminal is less than or equal to the preset threshold, the terminal may consider that the user may want to view the display screen of the terminal, and may automatically enable the ambient light-based adjustment function, or increase the frequency of automatic ambient light-based adjustment.

In a possible design, when the first area displays the black picture, the intensity of the ambient light that is detected by the first ambient light sensor and that is obtained by the terminal may include the following three cases. Case 1: When the first area displays the black picture, the terminal controls the first ambient light sensor to detect the intensity of the ambient light and obtain the detected intensity of the ambient light. When the first area displays the image frame picture, the first ambient light sensor does not work. Case 2: When the first area displays the black picture and the image frame picture, the first ambient light sensor is in a working state, to be specific, keeps detecting the intensity of the ambient light. The terminal obtains, only when the first area displays the black picture, the intensity of the ambient light detected by the first ambient light sensor. In other words, the terminal obtains only the intensity of the ambient light detected by the ambient light sensor when the first area displays the black picture. Case 3: similar to case 2. The first ambient light sensor is always in a working state, and the terminal also periodically obtains the intensity of the ambient light from the ambient light sensor. However, when adjusting the luminance of the screen, the terminal uses only the intensity of the ambient light detected by the ambient light sensor when the first area displays the black picture.

That the terminal controls the first area of the display screen to display the black picture for a plurality of times may specifically be: The terminal controls the first area to periodically or aperiodically display the black picture.

In a possible design, a display frequency of the terminal is f Hz, and the interval between consecutively displaying, in the first area controlled by the terminal, the black picture for two times is greater than or equal to $1/(a \times f)$ seconds, where a is a positive integer greater than or equal to 1.

For example, an example in which a=1 and the black picture is periodically displayed is used for description. A period of periodically displaying, in the first area controlled by the terminal, the black picture is 1/f. In other words, a frequency of displaying, in the first area controlled by the terminal, the black picture is the same as the display frequency of the terminal. Within one second, the terminal may display f frames of image frame pictures and the first area may also display the black picture for f times. It can be learned that, the terminal controls the first area of the display screen to display the black picture once in each of the f frames of image frame pictures.

Therefore, the terminal may control the first area to display the black picture once within a time period of refreshing each frame of picture. The terminal may instruct the ambient light sensor to detect the ambient light within a time period in which the first area displays the black picture. After detection by the ambient light sensor is completed, the terminal may automatically adjust the luminance of the display screen based on a detection result. This improves user experience.

Different types of light sources may be blinking. The user may perceive a blinking of a light source in a case of a low blinking frequency. In this case, if the terminal detects the ambient light within a specific time period only for a few times, and detection duration is very short, there may be a relatively great fluctuation in ambient light detection data. As a result, the terminal may adjust the luminance of the display screen to be comparatively bright or dark. To enhance adjustment of the luminance of the display screen by the terminal, in this embodiment of this application, a value of a may be increased to increase the frequency of displaying the black picture, so that a frequency of detecting the ambient light can be increased. In other words, a quantity of times of detecting the ambient light by the terminal within a specific time period is increased, to obtain a plurality of pieces of detection data within the specific time period. The plurality of pieces of detection data is filtered, for example, an average value of a plurality of pieces of detection data in one frame of picture is used to obtain relatively stable ambient light data. Further, the terminal adjusts the luminance of the display screen based on the ambient light data. This improves user experience.

In a possible design, duration of displaying the black picture each time is first duration, duration required by the ambient light sensor of detecting the ambient light is second duration, and the first duration is greater than or equal to the second duration.

In a possible design, the image frame picture is a display user interface presented by the terminal to the user.

In a possible design, that the terminal controls the first area to display the black picture for a plurality of times includes: controlling, by the terminal, the first area to display N black pictures for a plurality of times within a first time period T1; and when the first area displays the black picture, the obtaining, by the terminal, an intensity of the ambient light detected by the first ambient light sensor includes: when M of the N black pictures are displayed, separately controlling, by the terminal, the first ambient light sensor to detect the intensity of the ambient light for M times, where M is less than or equal to N; the automatically adjusting, by the terminal, luminance of the display screen based on the intensity of the detected ambient light includes: automatically adjusting, by the terminal, the luminance of the display screen based on the intensity of the ambient light detected each time.

To be specific, when the first area displays the black picture each time, the terminal may control the ambient light sensor to detect the intensity of the ambient light, and automatically adjust the luminance of the display screen based on the intensity of the ambient light detected each time. The terminal may alternatively control, when the first area displays the black picture at some time points, the ambient light sensor to detect the intensity of the ambient light, and automatically adjust the luminance of the display screen based on the intensity of the ambient light. When the first area displays the black picture at some other time points, the terminal may control the ambient light sensor not to detect the intensity of the ambient light.

In a possible design, the terminal may increase a drive current intensity of the first area, to increase the luminance of displaying the image frame picture in the first area. In this way, display luminance of the first area is the same as luminance of other areas of the display screen, and the first area does not become sometimes bright and sometimes dark. This improves user experience.

In a possible design, the terminal controls the second area to display the black picture for a plurality of times. When the second area displays the black picture, the first area displays the image frame picture. The terminal controls, in an interval between consecutively displaying the black picture in the second area for two times, the second area to display the image frame picture.

The second area may be all or a part of another display area, other than the first area, on the display screen. A size of the second area may be greater than or equal to a size of the first area. In addition, the display screen of the terminal may include a plurality of second areas.

For example, it is assumed that the terminal currently displays a first frame of image frame picture. When refreshing a second frame of image frame picture, the terminal first displays a part of the black picture. A size of the part of the black picture is greater than or equal to the size of the first area. The terminal then displays the black picture in a next area of the same size, and displays the second frame of image frame picture in an area that just displays the black picture. The terminal continuously moves downward to an area for displaying the black picture until the display screen displays the entire second frame of image frame picture. In this way, the terminal continuously refreshes and displays a third frame of image frame picture, a fourth frame of image frame picture, and the like.

Therefore, the display luminance of the first area is the same as the luminance of the other areas of the display screen, and the first area does not become sometimes bright and sometimes dark. This improves user experience.

In a possible design, the terminal further includes a second ambient light sensor, the second area includes an area used by the second ambient light sensor to receive ambient light, and the method further includes: when the second area displays the black picture, obtaining, by the terminal, an intensity of the ambient light detected by the second ambient light sensor; and automatically adjusting, by the terminal, the luminance of the display screen based on the intensity of the second ambient light detected by the second ambient light sensor.

The two ambient light sensors are disposed at a spacing from each other on a rear side of the display screen. For example, one ambient light sensor is disposed in a top portion of the display screen, and the other ambient light sensor is disposed at a middle position in a longitudinal direction of the display screen. In this case, when the terminal refreshes by using a policy 1, a policy 2, or a policy 3 in Embodiment 1, the black picture sequentially covers light receiving areas of the two ambient light sensors, and the terminal also sequentially notifies the two ambient light sensors to detect the ambient light. Therefore, in a process of displaying one frame of picture, the terminal may have two time periods for detecting the ambient light, to obtain two pieces of detection data.

In this way, a detection result of the ambient light sensor obtained by the terminal is not located at a position with the same intensity of the ambient light each time, for example, a position with strongest or weakest light intensity. This improves accuracy of the detection data and enhances adjustment of the luminance of the display screen.

In a possible design, the second ambient light sensor is located in a middle portion of the display screen.

In a possible design, the first ambient light sensor is located in a top portion of the display screen.

In a possible design, when the second area displays the black picture, the terminal controls a lower portion of the second area to display an $n^{th}$ frame of image frame picture, and an upper portion of the second area to display an $(n+1)^{th}$ frame of image frame picture; or when the second area displays the black picture, the terminal controls a lower portion of the second area to display an $n^{th}$ frame of image frame picture, and an upper portion of the second area to display the $n^{th}$ frame of image frame picture.

In a possible design, the black picture includes a picture whose grayscale value is less than or equal to a preset threshold.

The black picture may be a picture presented when the display screen does not emit light. Alternatively, the black picture may be a very dark gray picture presented when the display screen emits light, and may be visually considered as a black picture. The black picture is not limited in this application.

An example in which the display screen of the terminal is a self-luminous screen is used for description. The terminal may turn off a light emitting unit in the first area, so that the first area displays the black picture. The display screen does not emit light, and therefore the display screen is not affected by light emitted by the display screen. In this case, light received by the ambient light sensor by using the display screen may be considered as the ambient light. An accurate ambient light detection result can be obtained when the ambient light sensor detects the ambient light. The light emitting unit may be an LED light or the like.

Alternatively, the terminal may control a grayscale value of a display picture in the first area of the display screen to be less than or equal to a preset threshold, so that the first area displays the very dark gray picture. Light emitted by the display screen is relatively weak. In this case, the light received by the ambient light sensor by using the display screen may be approximately considered as the ambient light. A relatively accurate ambient light detection result can be obtained when the ambient light sensor detects the ambient light.

In a possible design, the terminal controls the display frequency and a frequency of power-frequency current of the display screen to form a phase difference.

Specifically, the terminal uses a first display frequency when the user does not enable the function of automatically adjusting the luminance of the screen based on the ambient light. The first display frequency may be any value. The terminal uses a second display frequency when the user enables the function of automatically adjusting the luminance of the screen based on the ambient light. There is a phase difference between the second display frequency and the frequency of the power-frequency current, to eliminate impact of a light source generated by the power-frequency current, and enhance automatic adjustment of an intensity of the screen by the terminal. This improves user experience.

For example, the second frequency may be a value that is not 50 Hz or a multiple of 50 Hz, or a value that is not 60 Hz or a multiple of 60 Hz. In this way, there is a phase difference between the display frequency and a flicker frequency of the ambient light. For example, the display frequency of the terminal is set to 61 Hz, 63 Hz, or the like.

According to a second aspect, a terminal is provided, including: one or more processors, one or more memories, a display screen, and a first ambient light sensor, where the first ambient light sensor is located under the display screen, and a display area of the display screen includes a first area and a second area; the first area includes an area used by the first ambient light sensor to receive ambient light, and the second area is at least a part of an area, other than the first area, in the display area; the memory and the display screen are coupled to the processor; the memory is configured to store computer program code, and the computer program code includes a computer instruction; and when the processor executes the computer instruction, the terminal is enabled to perform any method in the first aspect.

According to a third aspect, an ambient light detection apparatus is provided, where the ambient light detection apparatus is included in a terminal. Alternatively, the ambient light detection apparatus is the terminal. The apparatus has a function of implementing actions of the terminal in the method in the first aspect. The function may be implemented by hardware, or may be implemented by hardware executing corresponding software. The hardware or software includes one or more modules or units that correspond to the foregoing function.

According to a fourth aspect, a computer storage medium is provided, including a computer instruction. When the computer instruction runs on a terminal, the terminal is enabled to perform the ambient light detection method in any possible design method in the first aspect.

According to a fifth aspect, a computer program product is provided. When the computer program product runs on a computer, the computer is enabled to perform the ambient light detection method in any possible design method in the first aspect.

According to a sixth aspect, a data processing system is provided, including modules configured to perform the method in the first aspect.

According to a seventh aspect, an embodiment of this application further provides a proximity detection solution. The ambient light sensor in the method, the terminal, the apparatus, the computer storage medium, the computer program product, and the data processing system that are provided in the foregoing aspects may be replaced with an optical proximity sensor. A position of the optical proximity sensor in the terminal is the same as a position of the ambient light sensor in the terminal. In addition, a method for controlling, by the terminal, the display screen to perform display is the same as the method for controlling, by the terminal, the display screen to perform display in the foregoing ambient light detection solution. The terminal enables the optical proximity sensor after a preset area of a display screen displays a preset picture. A light of the optical proximity sensor emits an optical signal. After receiving reflected light from the outside, the terminal turns off the light of the optical proximity sensor. This can avoid potential impact caused by the light of the optical proximity sensor on the screen. It should be noted that the terminal may include both the ambient light sensor and the optical proximity sensor. Both the ambient light sensor and the optical proximity sensor may be disposed at the same positions of the terminal provided in the foregoing aspects.

According to an eighth aspect, an embodiment of this application further provides a terminal including a camera under a screen and a photographing method using the terminal. The terminal includes the screen and one or more cameras. At least one camera is located under the screen. For a specific position and structure of the camera located under the screen, refer to the position and a structure of the ambient light sensor or the optical proximity sensor in the foregoing solutions. In an implementation, the camera is located under the screen and is close to a top portion of the terminal. The photographing method using the terminal may include: a method for controlling, by the terminal, a display screen to perform display is the same as the method for controlling, by the terminal, the display screen to perform display in the foregoing ambient light detection solution; after a preset area (namely, an area including the camera) of the display screen displays a preset picture, controlling, by the terminal, the camera to perform exposure and obtain a preview picture, where an exposure time period is less than a time period of keeping the preset picture; and continuously controlling the camera to perform exposure by refreshing one frame of picture after another, to display the preview picture obtained by the camera on the display screen. This finally ensures a display effect and an imaging requirement of the camera under the screen. In this embodiment, the camera uses a transient exposure imaging manner, and the display screen uses a same refreshing method as that used in the foregoing ambient light detection solution. After a preset black picture is displayed, the camera performs exposure. An exposure time period is less than the time period of keeping the preset picture. The preset area periodically refreshes the black picture, to implement photographing of the camera.

DESCRIPTION OF EMBODIMENTS

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "plurality" means at least two.

When a user uses a terminal, there are ambient light sources such as natural light and lamp light. The ambient light sources of the terminal affect a display effect of a display screen of the terminal. Currently, an ambient light sensor is installed under the display screen to detect ambient light. A specific FOV is required during detection by the ambient light sensor, and therefore a position that is a part of the display screen and that is of the ambient light sensor cannot be used to display a picture. This affects user experience.

An ambient light detection method provided in this application may be performed by a terminal. The terminal may be, for example, a mobile phone 100 shown in FIG. 1a. The method may alternatively be performed by a central processing unit (CPU) of the terminal, or a control module that is in the terminal and that is configured to perform the ambient light detection method.

For example, the terminal in this application may be a mobile phone having a display screen (the mobile phone 100 shown in FIG. 1a), a tablet computer, a personal computer (PC), a personal digital assistant (PDA), a smart watch, a netbook, a wearable electronic device, an in-vehicle device, a household appliance having a display screen, a smart terminal, or the like. A specific form of the terminal is not specifically limited in this application.

Figure 1A:
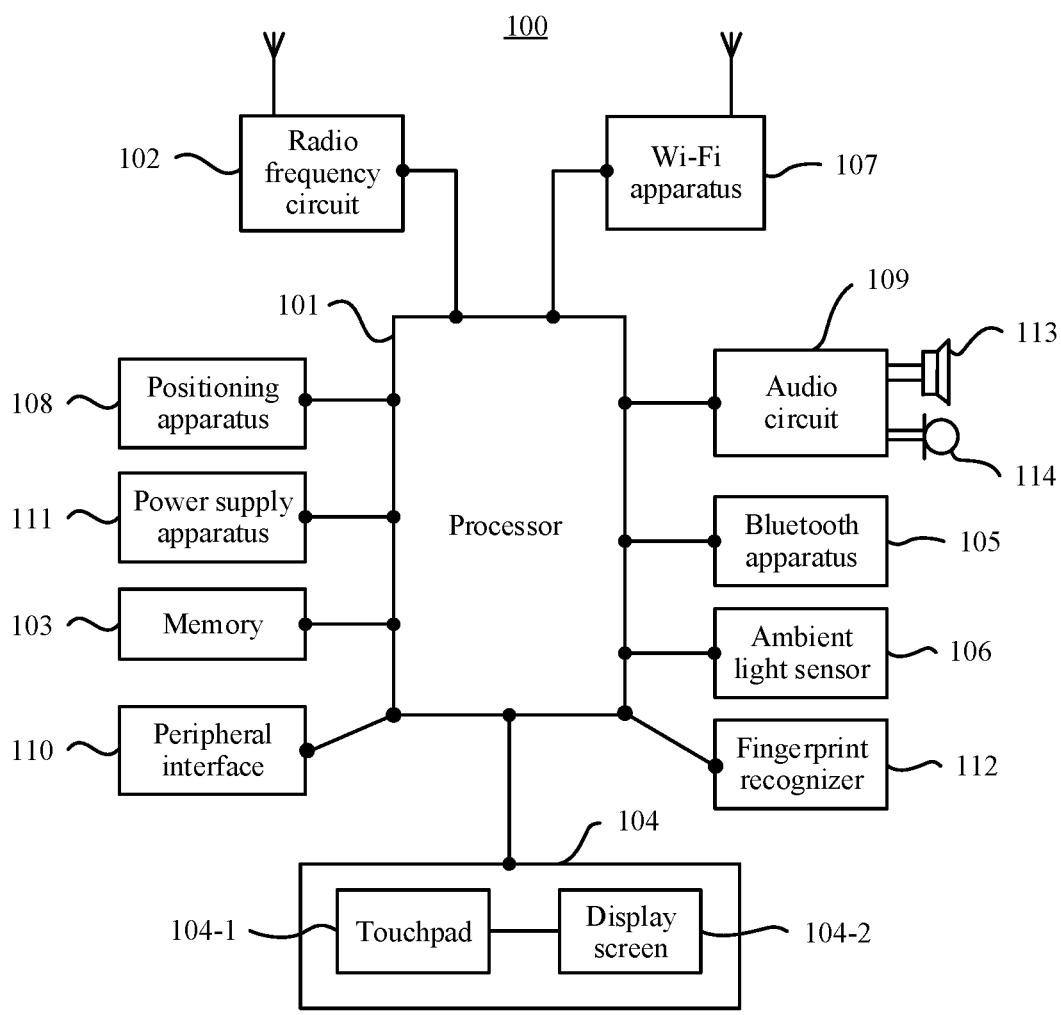
FIG. 1a is a schematic diagram of a hardware structure of a terminal according to this application.

As shown in FIG. 1a, the terminal is the mobile phone 100. The mobile phone 100 may specifically include components such as a processor 101, a radio frequency (RF) circuit 102, a memory 103, a touchscreen 104, a Bluetooth apparatus 105, one or more sensors 106, a wireless fidelity (Wi-Fi) apparatus 107, a positioning apparatus 108, an audio frequency circuit 109, a peripheral interface 110, and a power supply apparatus 111. These components may communicate by using one or more communications buses or signal cables (not shown in FIG. 1a). A person skilled in the art may understand that a hardware structure shown in FIG. 1a does not constitute any limitation on the mobile phone, and the mobile phone 100 may include more or fewer components than those shown in the figure, or may combine some components, or may have different component arrangements.

The following describes the components of the mobile phone 100 in detail with reference to FIG. 1a.

The processor 101 is a control center of the mobile phone 100. The processor 101 is connected to parts of the mobile phone 100 by using various interfaces and cables, runs or executes an application program stored in the memory 103, and invokes data stored in the memory 103, to perform various functions of the mobile phone 100 and process data. In some embodiments, the processor 101 may include one or more processing units. In some embodiments, the processor 101 may further include a fingerprint verification chip, configured to verify a collected fingerprint.

In some embodiments of this application, the processor 101 may further include one or more microcontroller units (MCU). The MCU may be configured to control a display picture of a display screen 104-2. Specifically, the MCU may read to-be-displayed content from the memory 103, and instruct the display screen 104-2 to display a corresponding picture.

The radio frequency circuit 102 may be configured to send and receive a radio signal in an information receiving and sending process or a call process. Particularly, after receiving downlink data from a base station, the radio frequency circuit 102 may send the downlink data to the processor 101 for processing, and sends related uplink data to the base station. Generally, the radio frequency circuit 140 includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to global system for mobile communications, general packet radio service, code division multiple access, wideband code division multiple access, long term evolution, email, SMS message service, and the like.

The memory 103 is configured to store an application program and data. The processor 101 runs the application program and the data stored in the memory 103, to execute various functions of the mobile phone 100 and process data. The memory 103 mainly includes a program storage area and a data storage area. The program storage area may store an operating system, and an application program required by at least one function (for example, a sound playing function or an image playing function). The data storage area may store data (for example, audio data or a phonebook) created based on use of the mobile phone 100. In addition, the memory 103 may include a high-speed random access memory (RAM), and may further include a non-volatile memory such as a magnetic disk storage device, a flash memory device, or another volatile solid-state memory device. The memory 103 may store various operating systems such as an iOS® operating system developed by the Apple Inc. and an Android® operating system developed by the Google Inc. The memory 103 may be standalone, and is connected to the processor 101 by using the communication bus; or the memory 103 may be integrated with the processor 101.

The touchscreen 104 may specifically include a touchpad 104-1 and a display screen 104-2.

The touchpad 104-1 can collect a touch event performed by a user on or near the mobile phone 100 (for example, an operation performed by the user on the touchpad 104-1 or near the touchpad 104-1 by using any suitable object such as a finger or a stylus), and send collected touch information to another component (such as the processor 101). The touch event of the user near the touch panel 104-1 may be referred to as floating touch control. The floating touch control may mean that the user does not need to directly touch the touch panel to select, move, or drag a target (for example, an icon), and instead, the user only needs to be near a device to implement a desired function. In addition, the touchpad 104-1 may be implemented in a plurality of types such as a resistive type, a capacitive type, an infrared type, or a surface acoustic wave type.

The display screen 104-2 may be configured to display information entered by the user, information provided for the user, and various menus of the mobile phone 100. The display screen 104-2 may be configured in a form of a liquid crystal display, an organic light-emitting diode (OLED), or the like. The touchpad 104-1 may cover the display screen 104-2. After detecting the touch event on or near the touchpad 104-1, the touchpad 104-1 transfers the touch event to the processor 101 to determine a type of the touch event. Then, the processor 101 may provide corresponding visual output on the display screen 104-2 based on the type of the touch event. Although in FIG. 1*a*, the touchpad 104-1 and the display screen 104-2 are used as two independent components to implement input and output functions of the mobile phone 100, in some embodiments, the touchpad 104-1 and the display screen 104-2 may be integrated to implement the input and output functions of the mobile phone 100. It may be understood that the touchscreen 104 is formed by stacking a plurality of layers of materials. In the embodiments of this application, only the touchpad (layer) and the display screen (layer) are displayed, and another layer is not recorded in the embodiments of this application. In addition, the touchpad 104-1 may be disposed on a front side of the mobile phone 100 in a full panel form, and the display screen 104-2 may also be disposed on the front side of the mobile phone 100 in a full panel form. In this way, a bezel-less structure can be implemented on the front side of the mobile phone.

In addition, the mobile phone 100 may further have a fingerprint recognition function. For example, a fingerprint recognizer 112 may be disposed on a back side of the mobile phone 100 (for example, below a rear-facing camera), or the fingerprint recognizer 112 may be configured on the front side of the mobile phone 100 (for example, below the touchscreen 104). For another example, a fingerprint collection device 112 may be disposed on the touchscreen 104 to implement the fingerprint recognition function. In other words, the fingerprint collection device 112 and the touchscreen 104 may be integrated to implement the fingerprint recognition function of the mobile phone 100. In this case, the fingerprint collection device 112 is disposed on the touchscreen 104, and may be a part of the touchscreen 104, or may be disposed on the touchscreen 104 in another manner. A main component of the fingerprint collection device 112 in the embodiments of this application is a fingerprint sensor. The fingerprint sensor may use any type of sensing technology, which includes but is not limited to an optical sensing technology, a capacitive sensing technology, a piezoelectric sensing technology, an ultrasonic sensing technology, and the like.

The mobile phone 100 may further include a Bluetooth apparatus 105, configured to implement data exchange between the mobile phone 100 and another short-range device (for example, a mobile phone or a smart watch). In the embodiments of this application, the Bluetooth apparatus may be an integrated circuit, a Bluetooth chip, or the like.

In this application, the mobile phone 100 further includes one or more ambient light sensors 106. The ambient light sensor 106 may adjust luminance of the display screen 104-2 based on an intensity of ambient light. The one or more ambient light sensors 106 are located on the back side of the display screen 104-2. If foam or another material is disposed on the back side of the display screen 104-2, a space of a corresponding size is reserved at a position of the ambient light sensor 106 to accommodate the ambient light sensor 106.

Figure 2A:
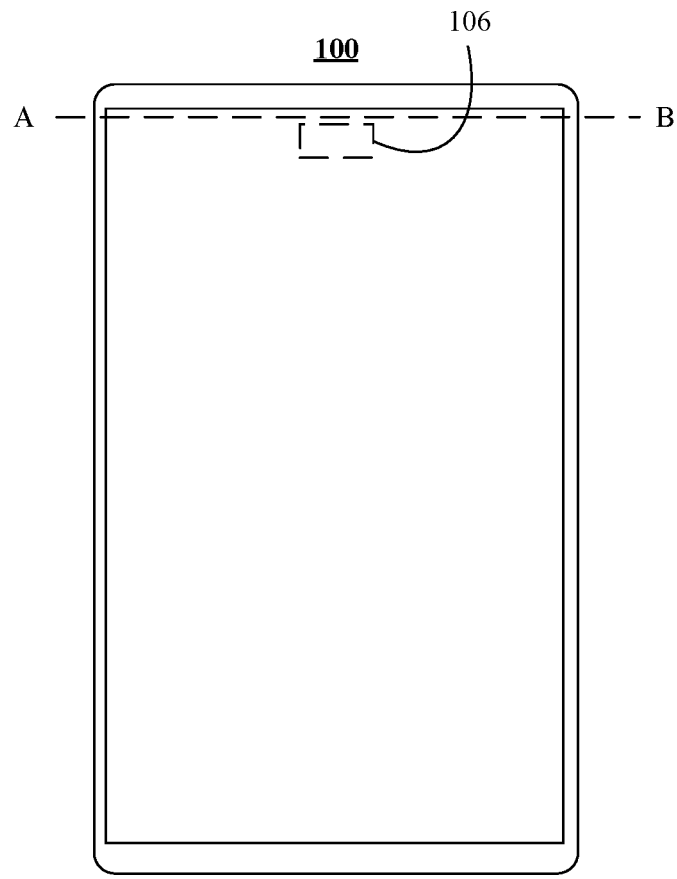
FIG. 2a is a schematic diagram of structural composition of a terminal according to this application.
Figure 2B:
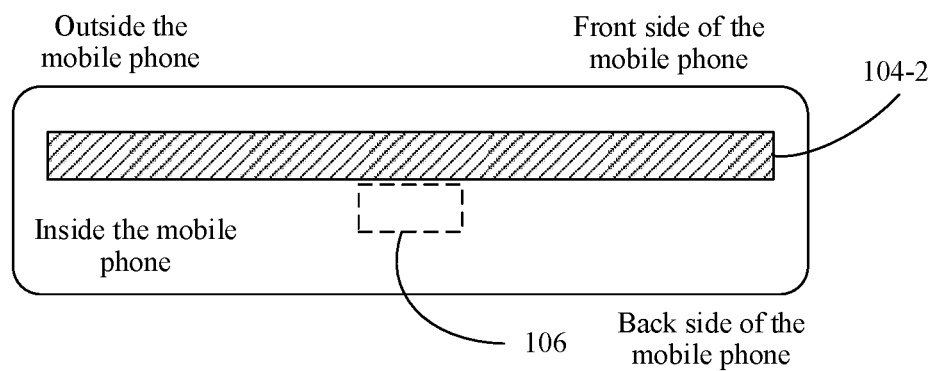
FIG. 2b is a schematic diagram of structural composition of a terminal according to this application.
Figure 2C:
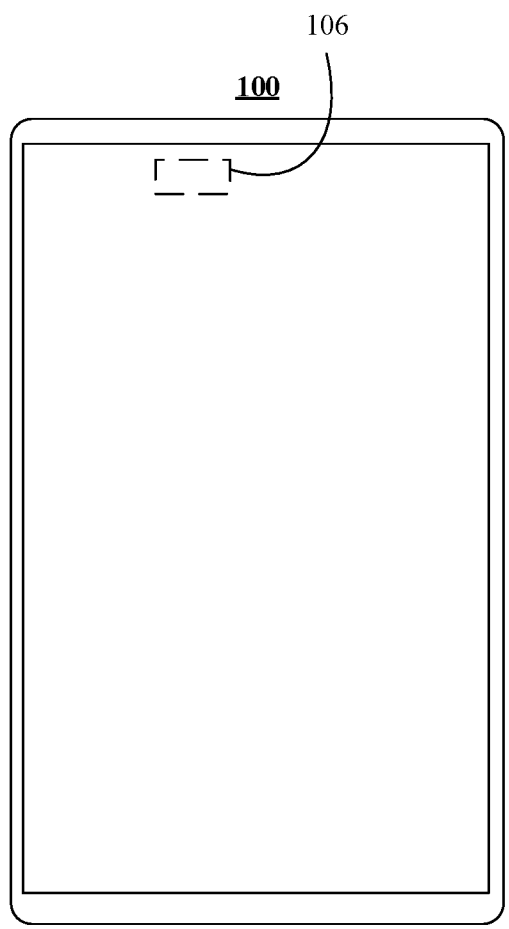
FIG. 2c is a schematic diagram of structural composition of a terminal according to this application.
Figure 2D:
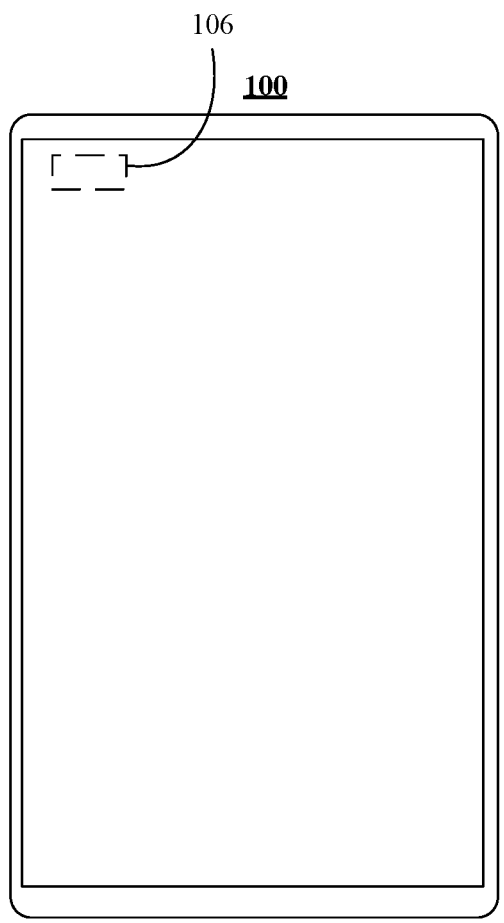
FIG. 2d is a schematic diagram of structural composition of a terminal according to this application.
Figure 2E:
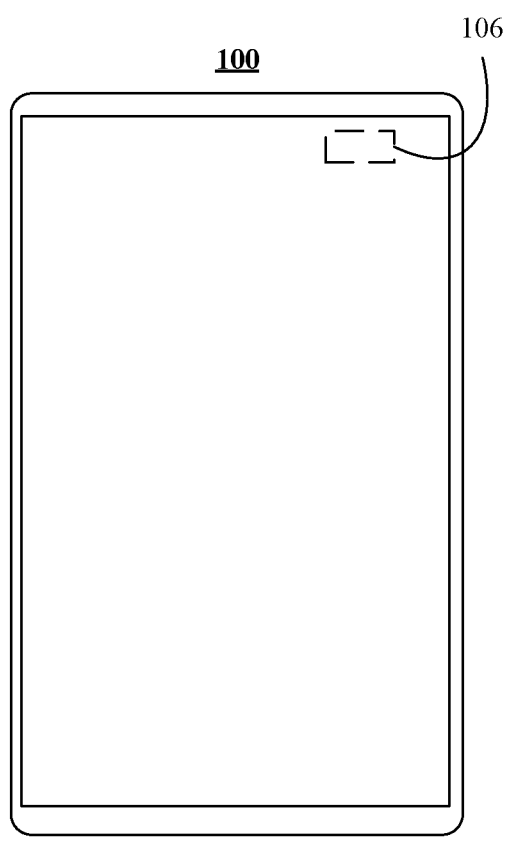
FIG. 2e is a schematic diagram of structural composition of a terminal according to this application.
Figure 2F:
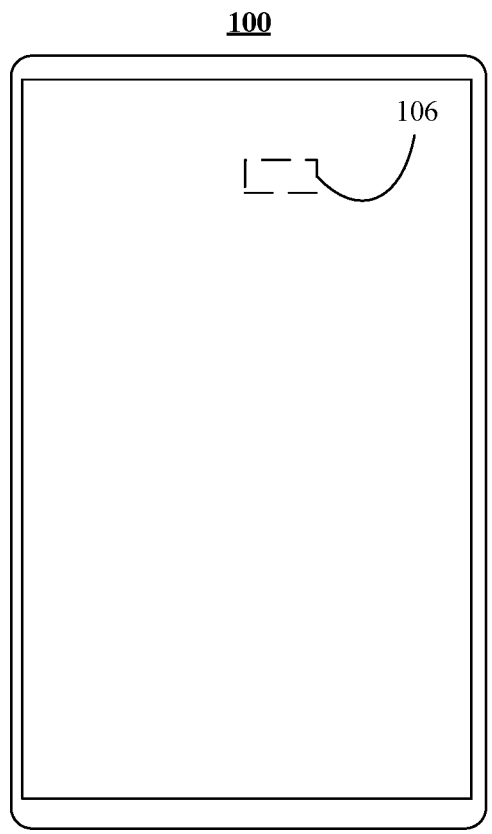
FIG. 2f is a schematic diagram of structural composition of a terminal according to this application.

FIG. 2*a* illustrates a front view of the mobile phone 100. The mobile phone 100 includes an ambient light sensor. The ambient light sensor 106 may be located under the display screen of the mobile phone. As shown in FIG. 2*a* and FIG. 2*b*, in the embodiments, a direction of the back side of the display screen 104-2, namely, a direction of the display screen away from the front side of the mobile phone, is referred to as a direction of under the display screen. FIG. 2*b* shows a cross-sectional view of the mobile phone 100 that uses an AB line as a cut-line direction of the mobile phone 100. The ambient light sensor 106 may be located at any position under the display screen. For example, as shown in FIG. 2*c*, FIG. 2*d*, FIG. 2*e*, or FIG. 2*f*, the ambient light sensor 106 may be close to a top portion of the mobile phone and be at a middle position (as shown in FIG. 2*a*); or the ambient light sensor 106 can be close to the top portion of the mobile phone and be at a left position (as shown in FIG. 2*c* and FIG. 2*d*); or the ambient light sensor 106 may be close to the top portion of the mobile phone and be at a right position (as shown in FIG. 2*e*); or the ambient light sensor 106 may be located under a central position of the display screen (as shown in FIG. 2*f*); or the display screen may be located at any other position under the display screen. It should be noted that an area of the display screen corresponding to the ambient light sensor 106 may be used to display picture content. The ambient light sensor 106 is invisible from the front view of the mobile phone. The display screen covering the ambient light sensor normally displays a picture in a same way as another part of the display screen.

Figure 3A:
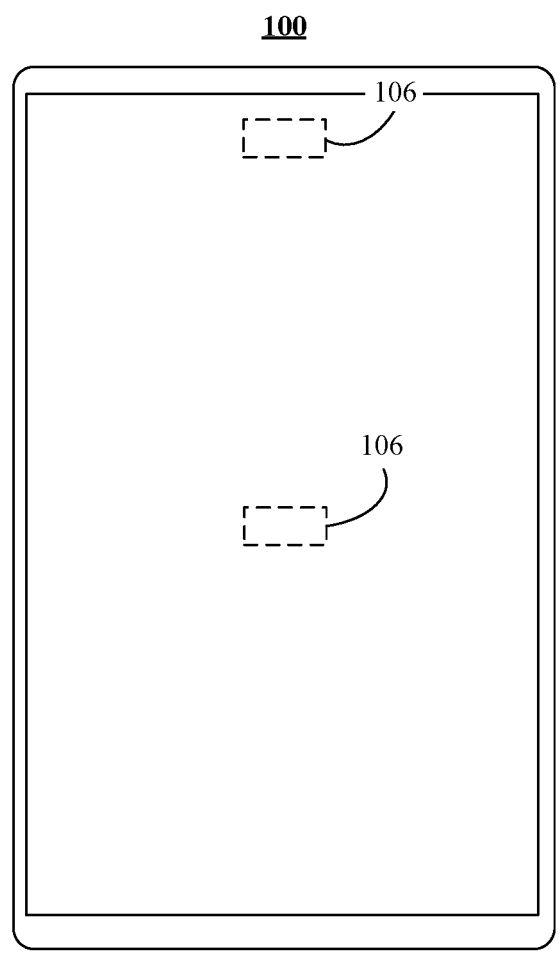
FIG. 3a is a schematic diagram of structural composition of a terminal according to this application.
Figure 3B:
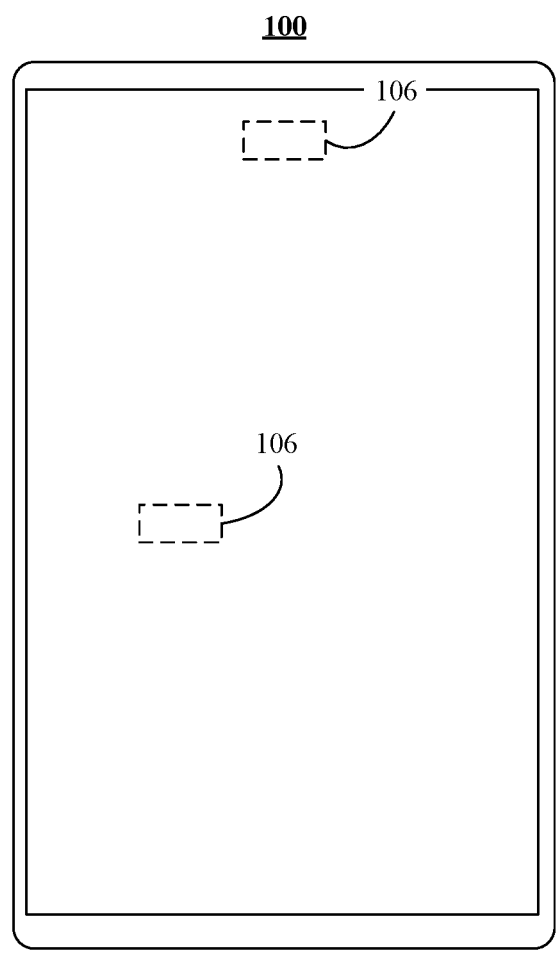
FIG. 3b is a schematic diagram of structural composition of a terminal according to this application.

FIG. 3*a* is a front view of the mobile phone 100. For example, the mobile phone 100 includes two ambient light sensors 106. Positions of the two ambient light sensors 106 are not limited in the embodiments. For example, one ambient light sensor may be disposed in the top portion of the display screen, and the other ambient light sensor may be disposed at the central position in the longitudinal direction of the display screen. An area of the display screen corresponding to the ambient light sensor 106 may be used to display a picture. In other words, the ambient light sensor 106 is invisible from the front view of the mobile phone. It should be noted that, when there are two or more ambient light sensors 106, the plurality of ambient light sensors 106 may be spaced from each other in a horizontal direction. In other words, any two ambient light sensors are not in a same row. However, the ambient light sensors 106 may be randomly disposed in the longitudinal direction. As shown in FIG. 3*a* and FIG. 3*b*, the two ambient light sensors are not in a same row. In other words, the sensors are spaced from each other in the horizontal direction. However, the two ambient light sensors may be in a same column as shown in FIG. 3*a*, or in different columns. In other words, the sensors are spaced from each other in the longitudinal direction as shown in FIG. 3*b*. A specific position and a relative position of the plurality of ambient light sensors are not limited in the embodiments of this application.

The mobile phone 100 may further include another sensor, such as a proximity sensor or a motion sensor. Specifically, the proximity sensor may power off the display screen when the mobile phone 100 is moved to an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape screen and a vertical screen, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone 100. Details are not described herein.

In this application, the mobile phone 100 may include one or more optical proximity sensors. The optical proximity sensor may sense that an external object is approaching. The mobile phone may determine, based on data detected by the optical proximity sensor, whether an object is approaching, and may further perform corresponding control. For example, in a call process, when detecting that an object is approaching, the mobile phone may turn off the display screen; when detecting that the object is away, the mobile phone may turn on the display screen. Alternatively, if detecting, by using the optical proximity sensor, that the mobile phone is in a bag, the mobile phone does not respond to an operation on the touchscreen. The one or more optical proximity sensors are located on the back side of the display screen. If foam or another material is disposed on the back side of the display screen, a space of a corresponding size is reserved at a position of the optical proximity sensor to accommodate the optical proximity sensor. In other words, the optical proximity sensor and the ambient light sensor may be at the same positions in the mobile phone. "The same positions" herein does not mean that the positions of the two sensors are limited to be completely the same. It may be understood that the two sensors are both located on the back side of the display screen, and are located in a display area of the display screen. In addition, the ambient light sensor shown in FIG. 2*a* to FIG. 2*g*, FIG. 3*a*, and FIG. 3*b* may be replaced with the optical proximity sensor. If the mobile phone includes both the ambient light sensor and the optical proximity sensor, the two sensors may be disposed next to each other. To be specific, the two sensors may be disposed at a relatively small or large spacing. For example, in a solution shown in FIG. 2*a* to FIG. 2*g*, the mobile phone may further include one or one optical proximity sensors in addition to the ambient light sensor. If the mobile phone further includes one optical proximity sensor, the optical proximity sensor and the ambient light sensor may be in a same row. To be specific, connection lines of the two sensors are parallel with or approximately parallel with a top edge of a frame of the mobile phone. Alternatively, the optical proximity sensor and the ambient light sensor may be located in different rows. To be specific, connection lines of the two sensors are not parallel with a top edge of a frame of the mobile phone. In other words, the two sensors may be disposed at any positions. If the mobile phone further includes a plurality of optical proximity sensors, positions of the plurality of optical proximity sensors are shown in FIG. 3*a* and FIG. 3*b*. In other words, the ambient light sensors in FIG. 3*a* and FIG. 3*b* may be replaced with the optical proximity sensors. Alternatively, two or more optical proximity sensors may be added in FIG. 3*a* and FIG. 3*b*. The plurality of optical proximity sensors are spaced from each other in a horizontal direction. In other words, the plurality of optical proximity sensors are not in a same row. Alternatively, in an implementation, one of the two ambient light sensors shown in FIG. 3*a* and FIG. 3*b* may be replaced with an optical proximity sensor.

The Wi-Fi apparatus 107 is configured to provide, for the mobile phone 100, network access that complies with a Wi-Fi-related standard or protocol. The mobile phone 100 may access a Wi-Fi access point by using the Wi-Fi apparatus 107, to help the user send and receive an email, browse a web page, access streaming media, and the like. The Wi-Fi apparatus 107 provides a wireless broadband Internet access for the user. In some other embodiments, the Wi-Fi apparatus 107 may alternatively be used as a Wi-Fi wireless access point, and may provide Wi-Fi network access for another device.

The positioning apparatus 108 is configured to provide a geographic location for the mobile phone 100. It may be understood that the positioning apparatus 108 may be specifically a receiver of a positioning system such as a global positioning system (GPS), a BeiDou navigation satellite system, or Russian GLONASS. After receiving the geographic location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (AGPS). The AGPS system assists the positioning apparatus 108 as an assisted server, to implement ranging and positioning services. In this case, the assisted positioning server communicates with a device such as the positioning apparatus 108 (namely, the GPS receiver)

of the mobile phone 100 by using a wireless communications network, to provide positioning assistance. In some other embodiments, the positioning apparatus 108 may be a positioning technology based on a Wi-Fi access point. Because each Wi-Fi hotspot has a globally unique media access control (MAC) address, if Wi-Fi is enabled, the device may scan and collect broadcast signals nearby Wi-Fi hotspots. Therefore, the MAC address broadcast by the Wi-Fi hotspot may be obtained. The device sends, to a position server by using the wireless communications network, data (for example, the MAC address) that can be used to mark the Wi-Fi hotspot. The position server finds a geographic location of each Wi-Fi hotspot, and combines strength of the broadcast signal of the Wi-Fi to calculate a geographic location of the device and send to the positioning apparatus 108 of the device.

The audio circuit 109, a speaker 113, and a microphone 114 may provide an audio interface between the user and the mobile phone 100. The audio circuit 109 may convert received audio data into an electrical signal and transmit the electrical signal to the speaker 113, and the speaker 113 converts the electrical signal into a sound signal for output. In addition, the microphone 114 converts a collected sound signal into an electrical signal, and the audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display screen, an external memory, or a subscriber identity module card). For example, the terminal is connected to the mouse through a universal serial bus (USB) interface, and the terminal is connected, by using a metal contact on a card slot of the subscriber identity module card, to the subscriber identity module (SIM) card provided by a telecommunications operator. The peripheral interface 110 may be configured to couple the external input/output peripheral device to the processor 101 and the memory 103.

In the embodiments of the present invention, the mobile phone 100 may communicate with another device in a device group by using the peripheral interface 110, for example, may receive, by using the peripheral interface 110, display data sent by another device, and display the display data, and the like. This is not limited in the embodiments of the present invention.

The mobile phone 100 may further include a power supply apparatus 111 (for example, a battery and a power supply management chip) that supplies power to the components. The battery may be logically connected to the processor 101 by using the power supply management chip, so that functions such as charging, discharging, and power consumption management are implemented by using the power supply apparatus 111.

Although not shown in FIG. 1a, the mobile phone 100 may further include a camera (a front-facing camera and/or a rear-facing camera), a flash, a micro projection apparatus, a near field communication (NFC) apparatus, and the like. Details are not described herein. The mobile phone 100 may include one or more front-facing cameras. The one or more front-facing cameras are disposed on the back side of the display screen. If foam or another material is disposed on the back side of the display screen, a space of a corresponding size is reserved at a position of the camera to accommodate the camera. In other words, the front-facing camera, the optical proximity sensor, and the ambient light sensor may be at the same positions in the mobile phone. "The same positions" herein does not mean that the positions are limited to be completely the same. It may be understood that the camera and the two sensors are all located on the back side of the display screen, and are located in the display area of the display screen. In addition, the ambient light sensor shown in FIG. 2a to FIG. 2g, FIG. 3a, and FIG. 3b may be replaced with the camera. If the mobile phone includes both the ambient light sensor (or the optical proximity sensor) and the front-facing camera, the devices may be disposed next to each other. To be specific, the devices may be disposed at a relatively small or large spacing. For example, in the solution shown in FIG. 2a to FIG. 2g, the mobile phone may further include one or one front-facing cameras in addition to the ambient light sensor. If the mobile phone further includes one front-facing camera, the front-facing camera and the ambient light sensor may be in a same row. To be specific, connection lines of the two devices are parallel with or approximately parallel with a top edge of a frame of the mobile phone. Alternatively, the front-facing camera and the ambient light sensor may be located in different rows. To be specific, connection lines of the two devices are not parallel with a top edge of a frame of the mobile phone. In other words, the two or three devices may be disposed at any positions. If the mobile phone further includes a plurality of front-facing cameras, the plurality of front-facing cameras may be disposed next to each other or may be spaced from each other. In other words, the plurality of front-facing cameras may be in a same row or different rows. Being in the same row means that connection lines of the plurality of front-facing cameras are parallel with the top edge of the frame of the mobile phone. In an implementation, the front-facing camera is located at a position close to the top portion of the mobile phone.

All methods in the following embodiments may be implemented on the mobile phone 100 having the foregoing hardware structure.

An embodiment of this application provides an ambient light detection method, applied to a terminal having a display screen. The terminal includes the display screen and at least one ambient light sensor. The ambient light sensor is located under the display screen. In other words, after the terminal is assembled, the ambient light sensor cannot be seen from appearance of the terminal. The direction of upper the display screen faces an outer surface or a front side of the terminal, and the direction of under the display screen faces an inner side or a back side of the terminal.

The terminal may be set, by default, to automatically adjust luminance of the screen based on ambient light. Alternatively, the terminal may provide a setting option for a user to choose whether to enable a function of automatically adjusting luminance of the screen based on ambient light. If the automatic ambient light-based adjustment function is disabled on the terminal, when the terminal works in a screen-on state, the terminal displays various user interfaces or content in all display areas of the display screen according to the prior art. If the automatic ambient light-based adjustment function is enabled on the terminal, when the terminal works in a screen-on state, the terminal displays by using a solution provided in this embodiment, which is specifically: The terminal controls a part of an area of the display screen to display a black picture for a plurality of times, to be specific, an area covering the ambient light sensor to display the black picture for the plurality of times, obtains an intensity of detected ambient light when the area displays the black picture, and automatically adjusts the luminance of the screen based on the intensity of the detected ambient light. In addition, when the area does not display the black picture, the area normally displays various user interfaces or content. The area displays the black picture for a very short time period, and human eyes hardly perceive the black picture. Therefore, from a perspective of the user, all the display areas of the display screen can normally display various interfaces or content. In other words, regardless of whether the user enables the automatic ambient light-based adjustment function, the user can view an entire display user interface in all the display areas of the display screen. In this way, disposing the ambient light sensor under the display screen does not affect a display effect, and the automatic ambient light-based adjustment function can be implemented.

Figure 1B:
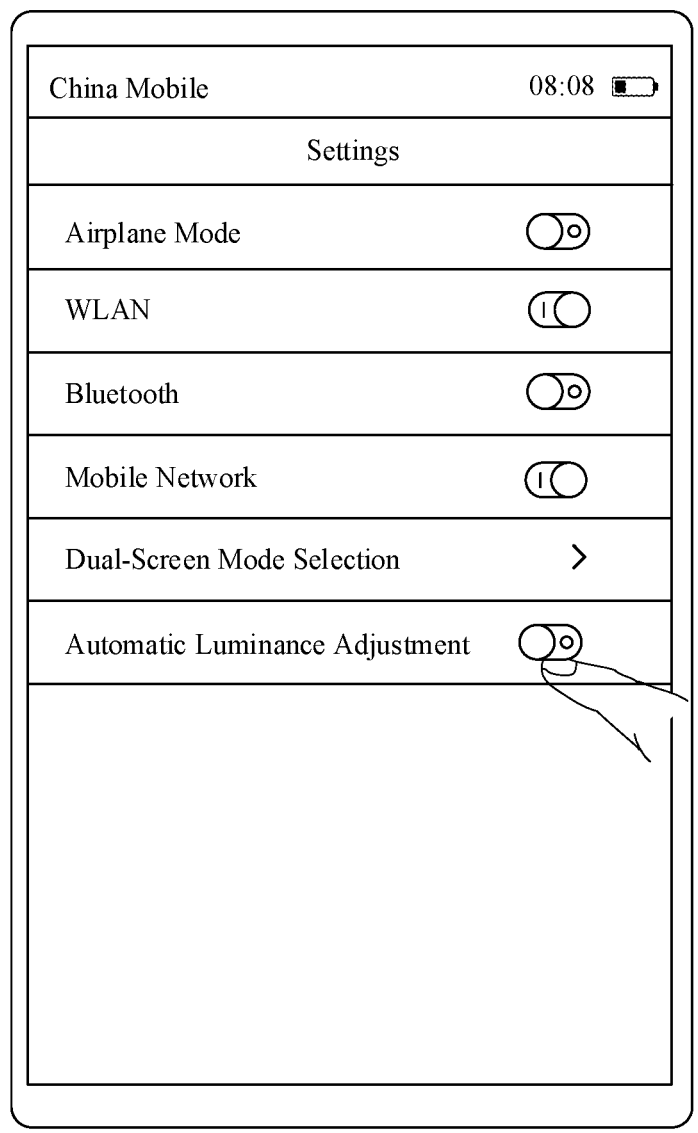
FIG. 1b is a schematic diagram of a display user interface of a terminal according to this application.

FIG. 1b shows a setting screen of the terminal. "Automatic Luminance Adjustment" corresponds to the function of automatically adjusting the luminance of the screen based on the ambient light by the terminal. In response to a tap operation of the user on an "automatic luminance adjustment" button, the terminal enables the function of automatically adjusting the luminance of the screen based on the ambient light.

Optionally, the terminal may alternatively determine, based on a currently running application, whether to automatically enable or disable the automatic ambient light-based adjustment function. For example, when the terminal runs a first-type application, the terminal may automatically disable or stop the ambient light-based adjustment function, or the terminal may automatically decrease a frequency of ambient light-based adjustment, to improve stability of displaying a picture by the terminal. This improves user experience. The first-type application may be an application that has a relatively high requirement for picture stability, for example, may be a video application, a game application, or a reading application. When the terminal switches from running the first-type application to running a non-first-type application, the terminal may automatically enable the ambient light-based adjustment function.

Optionally, the terminal may alternatively obtain a movement speed of the terminal. When the obtained movement speed of the terminal is greater than a preset threshold, the terminal may consider that the user is running, taking a vehicle, or the like, and the user may not want to view the display screen of the terminal, and the terminal may automatically disable or stop the ambient light-based adjustment function or further automatically decrease the frequency of ambient light-based adjustment. When the obtained movement speed of the terminal is less than or equal to the preset threshold, the terminal may consider that the user may want to view the display screen of the terminal, and the terminal may automatically enable the ambient light-based adjustment function.

In the ambient light detection solution provided in this embodiment of this application, the terminal works with the ambient light sensor to implement ambient light-based adjustment of the display screen. Specifically, the terminal controls a part of the display screen corresponding to the ambient light sensor to display the black picture, and the terminal obtains a detection result of the ambient light by the ambient light sensor when the part of the display screen displays the black picture. The terminal adjusts the luminance of the display screen of the terminal based on the detection result. When the terminal does not need the detection result of the ambient light, the terminal may control the part of the display screens corresponding to the ambient light sensor to display an image frame picture. The following separately describes cases in which the terminal has one ambient light sensor and a plurality of ambient light sensors.

EXAMPLE 1

In this embodiment, a terminal has one ambient light sensor. A display area of a display screen includes a first area. The first area covers a receiving area of the ambient light sensor. The receiving area of the ambient light sensor is an area in which the ambient light sensor receives ambient light when the ambient light sensor works. A size of the first area is not limited in this embodiment, provided that the first area can cover the receiving area. The display area of the display screen further includes a second area. The second area is a part or all of an area, other than the first area, in the display area of the display screen. The first area and the second area are located on the same display screen.

Figure 4A:
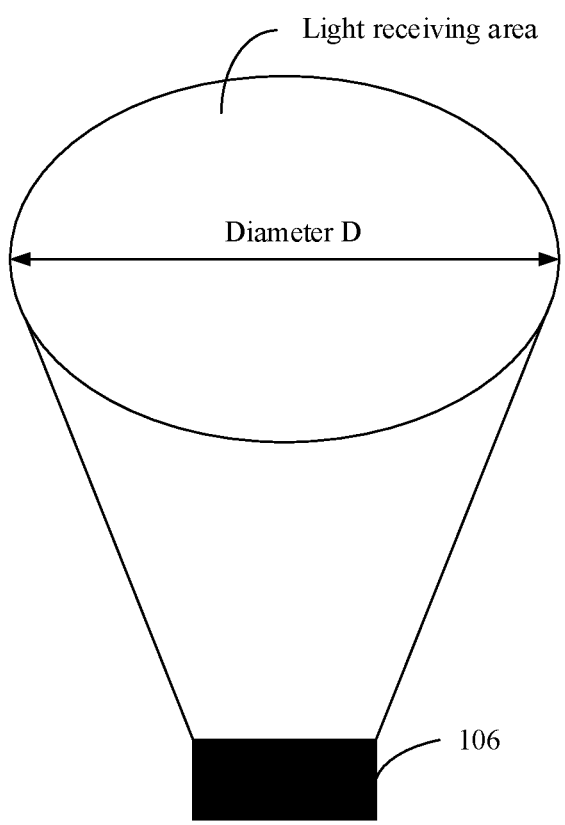
FIG. 4a is a schematic diagram of a receiving area of an ambient light sensor according to this application.

As shown in FIG. 4a, it can be learned from characteristics of the ambient light sensor that the receiving area of the ambient light sensor is a conical area, which is projected onto the display screen as a circular area with a diameter of D. In addition, there may be an optical crosstalk in a part, other than the circular area, in the display area of the display screen. This may affect accuracy of receiving ambient light data in the circular area with a diameter of D. A specific margin is usually reserved when the first area is disposed. For example, a 3-5 mm width is reserved outside the circular area with a diameter of D. In other words, the first area includes the circular area with the reserved specific margin.

In this embodiment, the display screen may be a self-luminous display screen. An example in which the display screen is an OLED display screen is used to describe a working principle of the self-luminous display screen. The OLED display screen is a display screen made of an organic electroluminescent diode. A display manner of the OLED display is different from that of a conventional liquid crystal display (LCD), and no backlight is required. The OLED display screen is formed by a very thin coating layer of organic material and a glass substrate, and emits light by using an electric current to drive the coating layer of organic material. The emitted light may be in a monochrome such as red, green, blue, or white, and may be in full colors. It should be noted that the OLED display screen may display black by disabling a light emitting unit of the display screen.

Figure 2G:
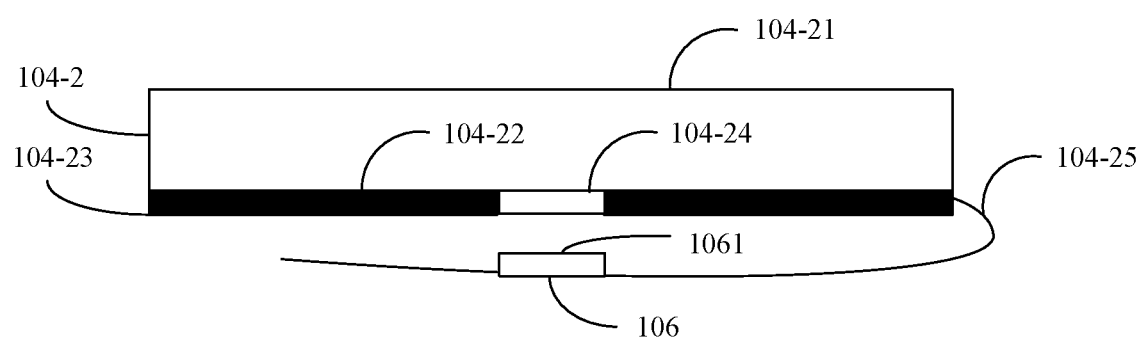
FIG. 2g is a schematic diagram of a structure of a display screen according to this application.

FIG. 2g shows an example structure of the display screen. The display screen 104-2 has an upper surface 104-21 and a lower surface 104-22. A vinyl layer 104-23 is located on the lower surface 104-22 of the display screen. The ambient light sensor 106 is disposed in a hollow-out area 104-24 of the vinyl layer 104-23. The ambient light sensor 106 may be disposed on a PCF flexible board 104-25. A light-sensitive element 1061 of the ambient light sensor faces the display screen 104-2 and is located on the lower surface 104-22 of the display screen. The ambient light sensor 106 and the display screen 104-2 may be separately connected to the processor 103 by using the FPC.

A name of the vinyl layer 104-23 may vary with different functions of the vinyl layer 104-23. For example, a light-shielding vinyl layer has a light shielding function, a buffering vinyl layer has a buffering function, a buffering and light-shielding vinyl layer has buffering and light shielding functions, or the like. The vinyl layer may be bonded to or directly disposed on the lower surface of the display screen. The vinyl layer in this embodiment unnecessarily has adhesion, and this is not limited herein. In this embodiment, after the automatic ambient light-based adjustment function is enabled on the terminal, the terminal controls the first area to display a black picture for at least two times. The terminal controls the first area to display an image frame picture in an interval between consecutively displaying the black picture in the first area for the at least two times. When the first area displays the black picture, the terminal obtains an intensity of ambient light detected by a first ambient light sensor. The terminal automatically adjusts luminance of the display screen based on the intensity of the detected ambient light. When the first area displays the black picture, the terminal controls a second area to display the image frame picture.

The black picture may be a picture presented when the display screen does not emit light. Alternatively, the black picture may be a very dark gray picture presented when the display screen emits light, and may be visually considered as a black picture. The black picture is not limited in this application.

It should be noted that the terminal usually uses a grayscale value to indicate a color depth of a tone in a black and white image. White and black are classified into several levels, according to a logarithmic relationship, usually ranging from 0 to 255. White is 255 and black is 0. Therefore, the black and white image is also referred to as a grayscale image or a grayscale picture. The terminal may control the grayscale value of a picture displayed on the display screen to be less than or equal to a preset threshold, so that the terminal displays a very dark gray picture, which may be approximately considered as a black picture.

In other words, the terminal may also control the display screen to display a picture whose grayscale is dark gray, light black, or black. Specifically, the terminal classifies luminance difference between the lightest and the darkest portions into several parts, to facilitate management and control of screen luminance in response to an input on the terminal. A perceptible grayscale may be roughly classified into seven levels: white, grayish white, light gray, gray, dark gray, light black, and black.

The image frame picture is a display user interface presented by the terminal to a user, and may include a specific user interface or content displayed to the user.

A display frequency of the terminal is f Hz, and the interval between consecutively displaying, in the first area controlled by the terminal, the black picture for two times is greater than or equal to $1/(a \times f)$ seconds. If the black picture is periodically displayed, a period for displaying the black picture is $1/(a \times f)$ seconds. In other words, the interval between consecutively displaying the black picture for two times is equal to $1/(a \times f)$ seconds, where a is a positive integer greater than or equal to 1.

For example, an example in which a=1 and the black picture is periodically displayed is used for description. A period of periodically displaying, in the first area controlled by the terminal, the black picture is 1/f. In other words, a frequency of displaying, in the first area controlled by the terminal, the black picture is the same as the display frequency of the terminal. Within one second, the terminal may display f frames of image frame pictures and the first area may also display the black picture for f times. It can be learned that, the terminal controls the first area of the display screen to display the black picture once in each of the f frames of image frame pictures.

Figure 6:
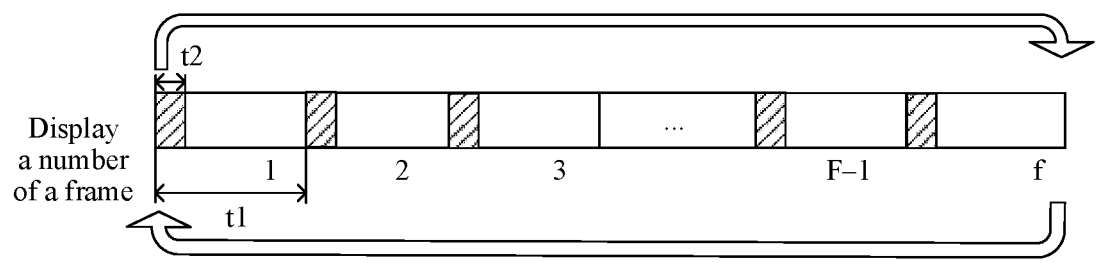
FIG. 6 is a schematic diagram of refreshing a picture by a terminal according to this application.

FIG. 6 is a schematic diagram of performing ambient light detection by a terminal. The display frequency of the terminal is f, and the period of periodically displaying, in the first area controlled by the terminal, the black picture is 1/f seconds. A time period t1 is a period of time in which the terminal displays one frame of image frame picture. A time period t2 is a period of time in which the terminal displays the black picture in the first area.

To sum up, the terminal controls the first area to display the black picture once within a time period when the terminal refreshes each frame of picture. The terminal may instruct the ambient light sensor to detect the ambient light within a time period in which the first area displays the black picture. After detection by the ambient light sensor is completed, the terminal may automatically adjust the luminance of the display screen based on a detection result. This improves user experience.

Different types of light sources may be blinking. The user may perceive a blinking of a light source in a case of a low blinking frequency. In this case, if the terminal detects the ambient light within a specific time period only for a few times, and detection duration is very short, there may be a relatively great fluctuation in ambient light detection data. As a result, the terminal may adjust the luminance of the display screen to be comparatively bright or dark. To enhance adjustment of the luminance of the display screen by the terminal, in this embodiment of this application, a value of a may be increased to increase a frequency of detecting the ambient light. In other words, a quantity of times of detecting the ambient light by the terminal within a specific time period is increased, to obtain a plurality of pieces of detection data within the specific time period. The plurality of pieces of detection data is filtered, for example, an average value of a plurality of pieces of detection data in one frame of picture is used to obtain relatively stable ambient light data. Further, the terminal adjusts the luminance of the display screen based on the ambient light data. This improves user experience.

Figure 10:
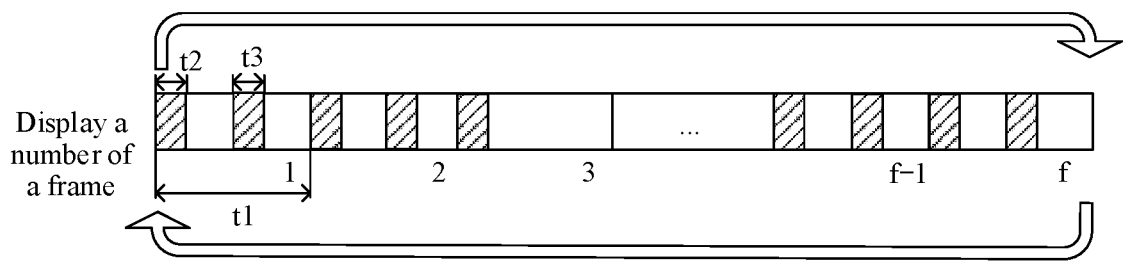
FIG. 10 is a schematic diagram of refreshing a picture by a terminal according to this application.
Figure 11A:
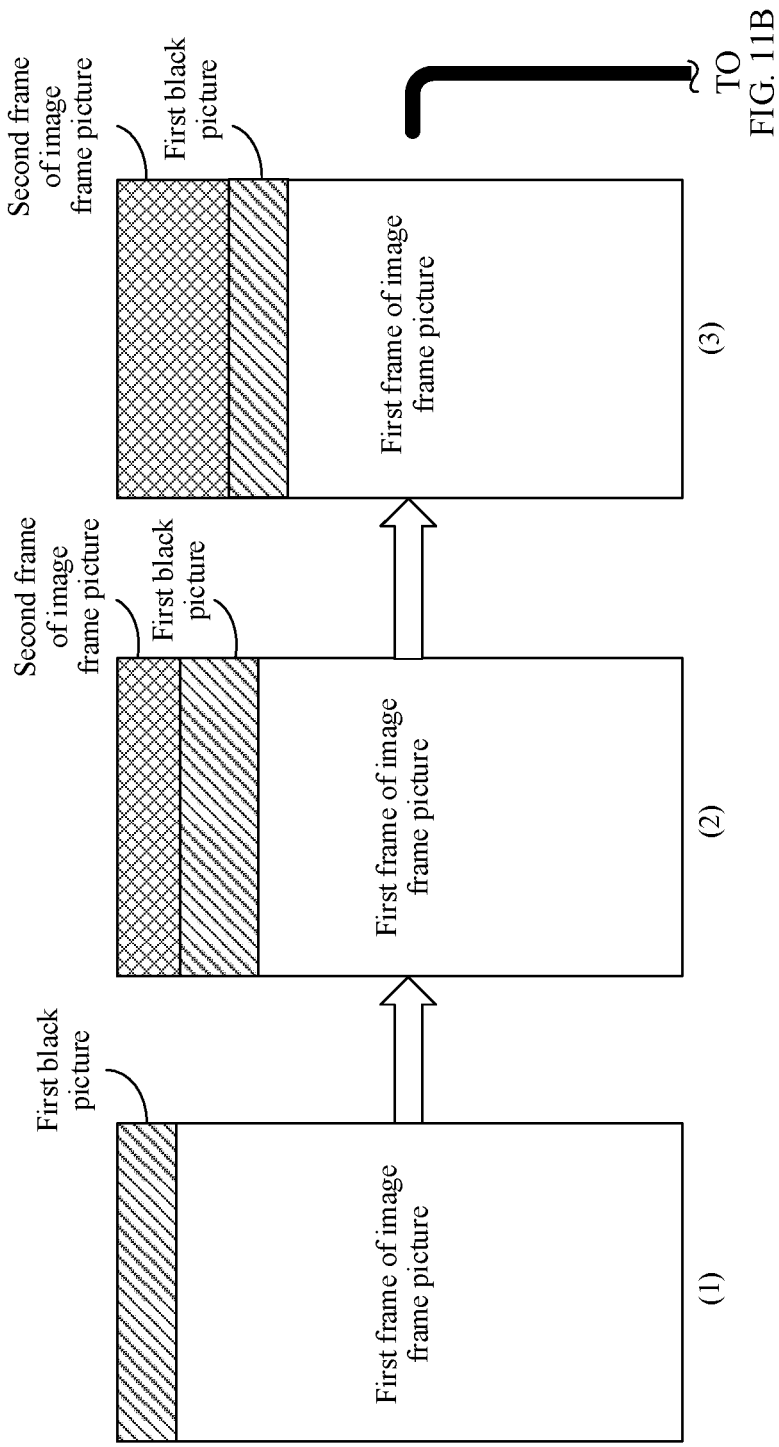
FIG. 11A, FIG. 11B, and FIG. 11C are schematic diagrams of refreshing a picture by a terminal according to this application.
Figure 11B:
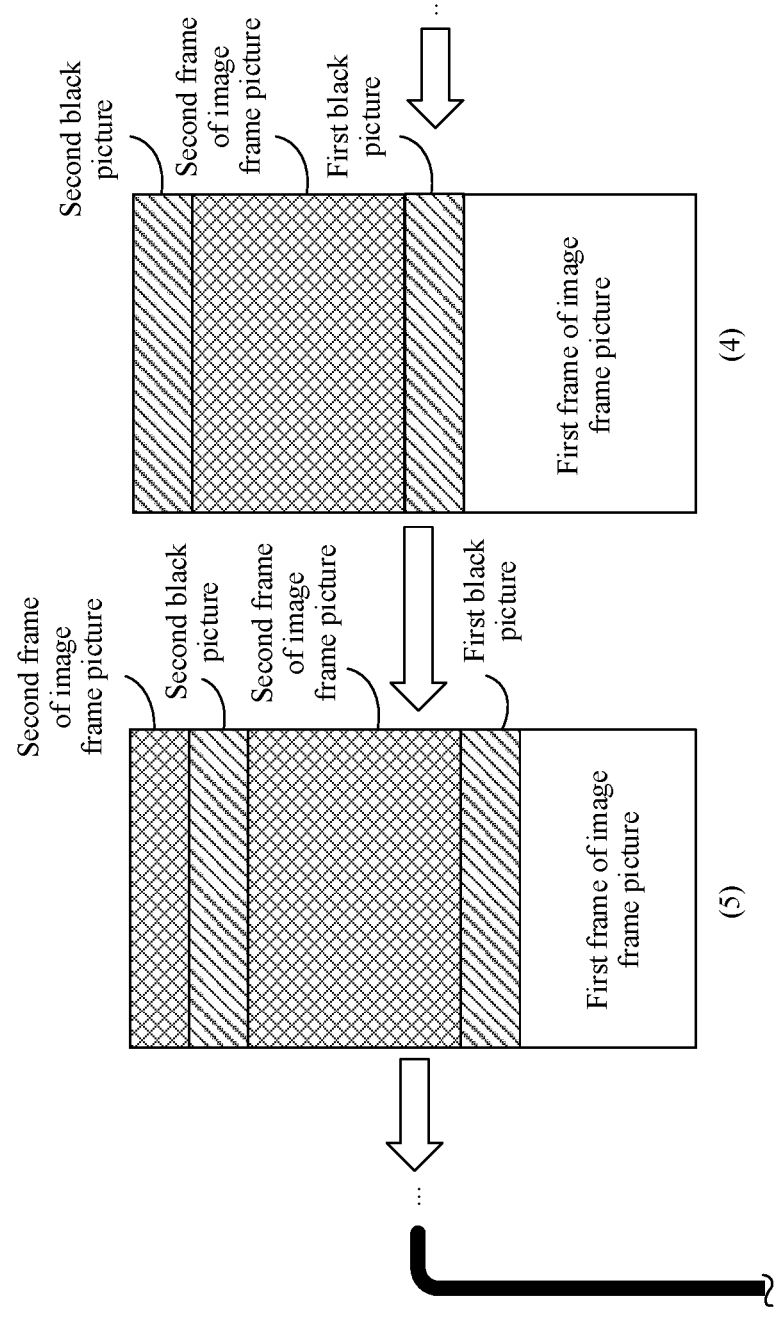
Figure 11C:
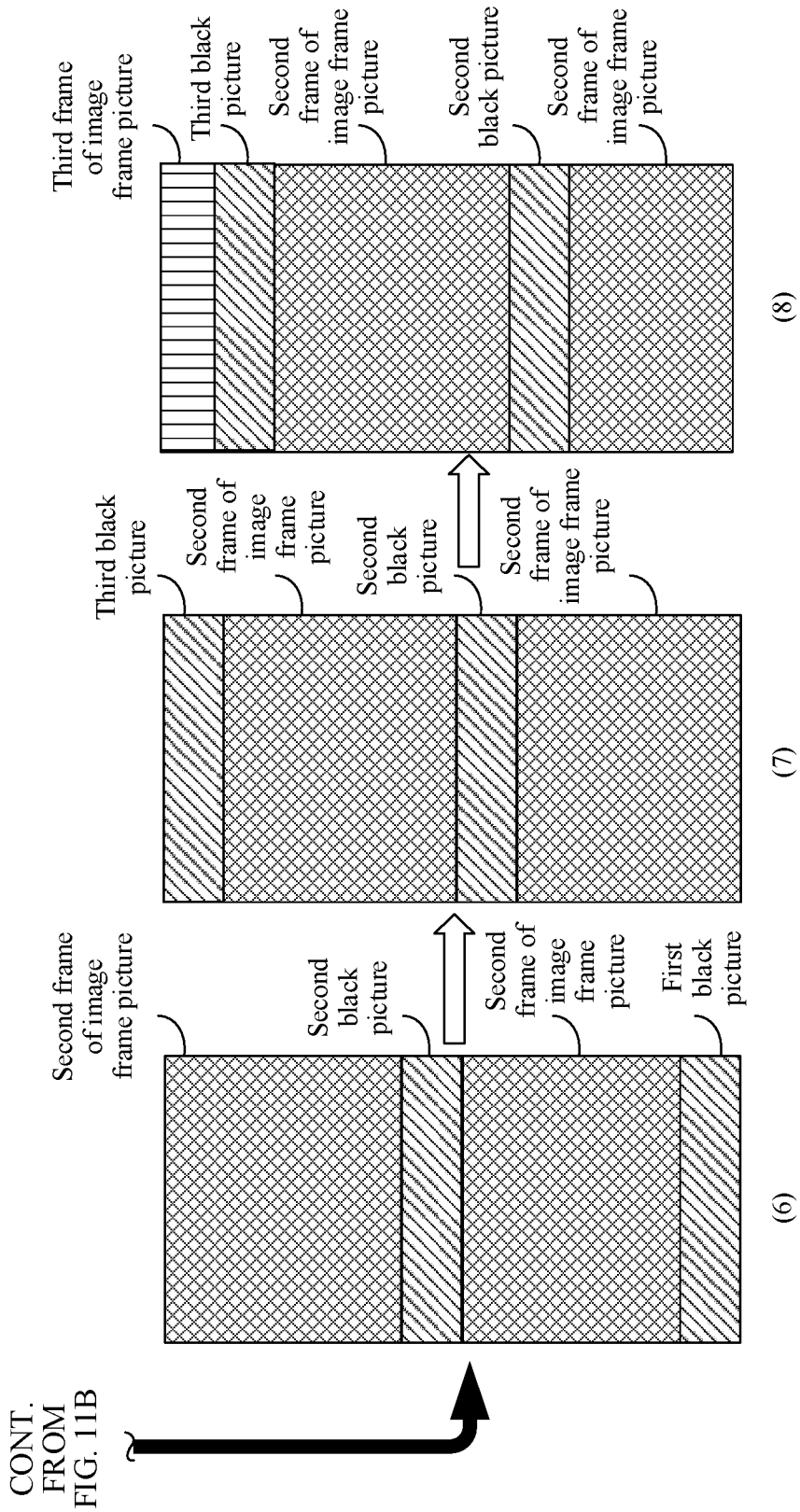

Therefore, when a is a positive integer greater than or equal to 2, the frequency of detecting the ambient light may be increased in this embodiment of this application. For example, an example in which a=2 and the black picture is periodically displayed is used for description. A period of periodically displaying, in the first area controlled by the terminal, the black picture is ½f. In other words, a frequency of displaying the black picture is 2f, which is two times the display frequency of the terminal. Within one second, the terminal may display f frames of image frame pictures and the first area displays the black picture for 2×f times. It can be learned that, the terminal controls the first area of the display screen to display the black picture for two times in each of the 2×f frames of image frame pictures. In other words, when the terminal displays each frame of picture, the terminal may control the first area of the display screen to display the black picture for a times. FIG. 10 is a schematic diagram of detecting, by a terminal, the ambient light when a is 2. The display frequency of the terminal is f, and the period of periodically displaying, in the first area controlled by the terminal, the black picture is ½f seconds. A time period t1 is a period of time in which the terminal displays one frame of image frame picture. A time period t2 and a time period t3 are respectively a period of time when the terminal displays the black picture in the first area. In other words, the terminal may control the first area of the display screen to display the black picture in each frame of picture in the time periods t2 and t3.

It should be noted that, when the first area displays the black picture each time, the terminal may control the ambient light sensor to detect the intensity of the ambient light, and automatically adjust the luminance of the display screen based on the intensity of the ambient light detected each time. The terminal may alternatively control, when the first area displays the black picture at some time points, the ambient light sensor to detect the intensity of the ambient light, and automatically adjust the luminance of the display screen based on the intensity of the ambient light. When the first area displays the black picture at some other time points, the terminal may control the ambient light sensor not to detect the intensity of the ambient light.

In other words, the terminal controls the first area to display N black pictures for a plurality of times in a first time period T1. When M of the N black pictures are displayed, the terminal separately controls the ambient light sensor to detect an intensity of ambient light for M times, where M is less than or equal to N. The terminal automatically adjusts the luminance of the display screen based on the intensity of the ambient light detected each time. When the other (N-M) black pictures of the N black pictures are displayed, the first ambient light sensor does not detect an intensity of ambient light.

The following description is provided by using an example in which the display frequency of the terminal is f Hz, a period of periodically displaying the black picture in the first area is 1/f seconds, and the first time period T1 is 1 second. The first area periodically displays f black pictures within 1 second. In other words, N=f. The ambient light sensor meets a condition of detecting the ambient light when the first area displays the f black pictures. In other words, the terminal has an opportunity to detect the ambient light for f times. The terminal may control, at each of the f times, the ambient light sensor to detect the ambient light, and obtain f detection results. In other words, M=N=f. The terminal may alternatively choose, at two or more of the f times, to perform detection, to obtain two or more detection results. In other words, M is greater than or equal to 2, and M is less than N.

It should be noted that the ambient light sensor needs to complete detection of the ambient light for at least once within the time period of displaying the black picture once in the first area. In other words, duration of displaying the black picture in the first area once is first duration, and duration of detecting the ambient light by the ambient sensor once is second duration. The first duration is greater than or equal to the second duration.

Optionally, the terminal may alternatively determine, based on a currently running application, whether to automatically increase the interval between consecutively displaying the black picture in the first area for two times. For example, when the terminal runs a first-type application, the terminal may automatically increase the interval between consecutively displaying the black picture in the first area for two times, and decrease a frequency of ambient light-based adjustment, to improve stability of displaying a picture by the terminal. This improves user experience. The first-type application may be an application that has a relatively high requirement for picture stability, for example, may be a video application, a game application, or a reading application. When the terminal runs a non-first-type application, the terminal may automatically decrease the interval between consecutively displaying the black picture in the first area for two times, or restore the interval to a default value, and increase the frequency of ambient light-based adjustment.

Optionally, the terminal may alternatively obtain a movement speed of the terminal. When the obtained movement speed of the terminal is greater than a preset threshold, the terminal may consider that the user is running, taking a vehicle, or the like, and the user may not want to view the display screen of the terminal, and may automatically increase the interval between consecutively displaying the black picture in the first area for two times, and decrease the frequency of ambient light-based adjustment. When the obtained movement speed of the terminal is less than or equal to the preset threshold, the terminal may consider that the user may want to view the display screen of the terminal, and may automatically decrease the interval between consecutively displaying the black picture in the first area for two times, or restore the interval to the default value, and increase the frequency of ambient light-based adjustment. A process in which the terminal controls the first area of the display screen to display the black picture once and a process in which the ambient light sensor detects the ambient light once are described in detail below. Details are as follows.

S101: The terminal controls the first area of the display screen to start displaying the black picture.

The first area is a part of the display area of the terminal, and covers the receiving area of the ambient light sensor. The receiving area of the ambient light sensor is the area in which the ambient light sensor receives the ambient light when the ambient light sensor works.

Figure 4B:
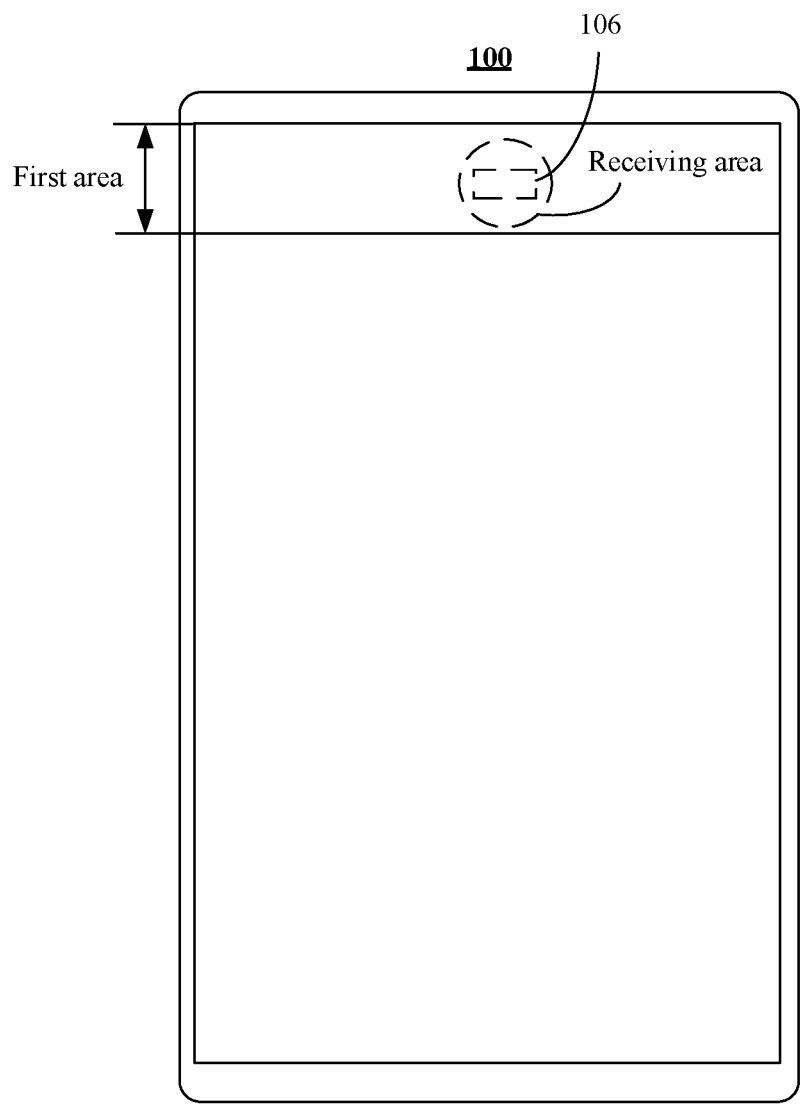
FIG. 4b is a schematic diagram of a first area according to this application.

For example, the terminal may determine the first area based on a position and characteristics of the ambient light sensor. Specifically, as shown in FIG. 4b, the receiving area of the ambient light sensor 106 is a conical area, which is projected onto the display screen as a circular area with a diameter of D. In addition, there may be an optical crosstalk in a part, other than the circular area, in the display area of the display screen. This may affect accuracy of receiving ambient light data in the circular area with a diameter of D. A specific margin is usually reserved when the first area is disposed. For example, a 3-5 mm width is reserved outside the circular area with a diameter of D. In other words, the first area includes the circular area with the reserved specific margin.

It should be noted that the terminal refreshes and displays a picture on a per-row basis, and therefore the first area may be set as a rectangular area that includes a circular area used by the ambient light sensor to receive light.

FIG. 4b is a schematic diagram of the first area of the terminal. The first area includes the area, namely, the receiving area, that is used to receive the ambient light when the ambient light sensor 106 works.

The black picture may be a picture presented when the display screen does not emit light. Alternatively, the black picture may be a very dark gray picture presented and may be visually considered as a black picture. The black picture is not limited in this application.

An example in which the display screen of the terminal is a self-luminous screen is used for description. The terminal may turn off a light emitting unit in the first area, so that the first area displays the black picture. The display screen does not emit light, and therefore the display screen is not affected by light emitted by the display screen. In this case, light received by the ambient light sensor by using the display screen may be considered as the ambient light. An accurate ambient light detection result can be obtained when the ambient light sensor detects the ambient light. The light emitting unit may be an LED light or the like.

Alternatively, the terminal may control a grayscale value of a display picture in the first area of the display screen to be less than or equal to a preset threshold, so that the first area displays the very dark gray picture. Light emitted by the display screen is relatively weak. In this case, the light received by the ambient light sensor by using the display screen may be approximately considered as the ambient light. A relatively accurate ambient light detection result can be obtained when the ambient light sensor detects the ambient light.

In a possible implementation, the processor in the terminal may control the display screen to display a picture. The processor delivers a display instruction to the display screen. The display instruction includes which content of a picture is displayed and which position of the display screen is used to display the picture. When the processor delivers an instruction to start displaying the black picture in the first area, the processor may record a current moment as a first moment.

For example, the following description is provided by using an example in which the light emitting unit of the display screen is turned off to display the black picture in the first area of the display screen. When the processor delivers an instruction to turn off the light emitting unit in the first area of the display screen, the processor records a current moment as a first moment.

S102: After displaying the black picture in the first area of the display screen, the terminal obtains an intensity of the ambient light detected by the ambient light sensor.

Specifically, the first area is determined based on the position and the characteristics of the ambient light sensor in the terminal, and therefore once the ambient light sensor in the terminal is determined, a position and a size of the first area are fixed. Further, a speed and a size of refreshing a picture are definite, a time period from a time point at which the terminal controls the first area to start displaying the black picture to a time point at which the first area completely displays the black picture may be calculated, namely, definite. The time period is recorded as a time period $\Delta T$ herein.

For example, if the terminal displays the black picture by turning off the light emitting unit in the first area of the display screen, the time period T includes a time period from a time point at which the light emitting unit receives a turn-off instruction to a time point at which the light emitting unit is completely in a turned-off state. In other words, a start moment of the time period $\Delta T$ is a moment at which the terminal starts to deliver the instruction to turn off the light emitting unit in the first area, namely, the first moment. An end moment of the time period $\Delta T$ is a moment at which the light emitting unit in the first area is completely turned off.

For example, if the terminal displays the black picture by displaying a very dark gray picture, the time period $\Delta T$ includes a time period in which the first area is refreshed for displaying once. It should be noted that the first area may include a plurality of rows. When refreshing the first area to display the black picture, the terminal may refresh and display the black picture row by row, or may refresh the first area by a plurality of rows.

After determining the first moment and the time period $\Delta T$, the terminal may determine a moment at which the first area completely displays the black picture. The moment is recorded as a second moment. After the second moment, the first area completely displays the black picture, and the terminal may obtain a detection of the ambient light detected by the ambient light sensor.

Optionally, after enabling the automatic ambient light-based adjustment function, the terminal may control the ambient light sensor to start detecting the intensity of the ambient light. At this time, the ambient light sensor detects the intensity of the ambient light regardless of which picture is displayed in the first area. After the first area of the display screen displays the black picture, the terminal reads detection data of the ambient light sensor at this time to adjust the luminance of the display screen. Alternatively, the terminal may periodically read the detection data of the ambient light sensor. However, when adjusting the luminance of the display screen, the terminal uses only the intensity of the ambient light detected by the ambient light sensor when the first area displays the black picture.

Optionally, the terminal may alternatively control the ambient light sensor to start detecting the intensity of the ambient light after the first area of the display screen displays the black picture, and read the detection data of the ambient light sensor to adjust the luminance of the display screen.

The following describes a process in detail by using the latter as an example.

Figure 5A:
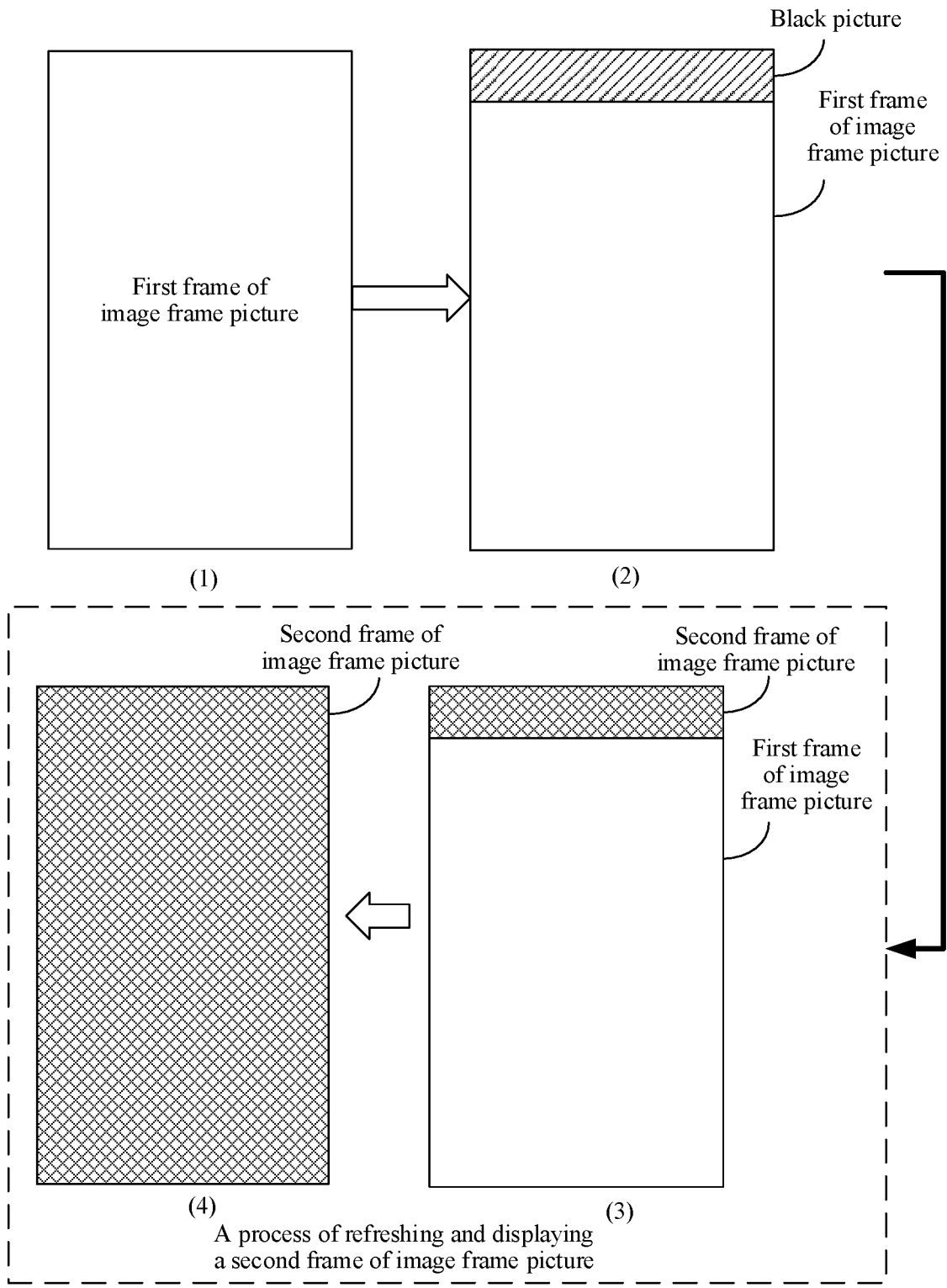
FIG. 5a is a schematic diagram of refreshing a picture by a terminal according to this application.

In a possible implementation, the terminal refreshes and displays a picture in sequence from a top portion of the display screen to a bottom portion of the display screen. It is assumed that the first area of the terminal is located at the top portion of the display screen. As shown in (1) in FIG. 5a, the display screen is currently displaying a first frame of image frame picture. At the first moment, the terminal starts controlling the first area of the display screen to display the black picture, and completely display the black picture after the time period $\Delta T$, namely, at the second moment. (2) in FIG. 5a is a display user interface of the terminal at the second moment. As shown in (2) in FIG. 5a, the first area presents the black picture, and other areas present the first frame of image frame picture. At or after the second moment, the processor outputs a trigger signal used to instruct the ambient light sensor to start detecting the ambient light. The trigger signal may be a software instruction, or may be a physical interrupt signal. This is not limited in this embodiment of this application.

Further, after waiting for a specific time period, the processor in the terminal may control the display screen to refresh the first area and display a second frame of image frame picture, as shown in (3) in FIG. 5a. The processor continues to refresh an area below the first area and display the second frame of image frame picture. As shown in (4) in FIG. 5a, all display areas are refreshed and the second frame of image frame picture is displayed. The specific time period is a time period used by the ambient light sensor to detect the ambient light, namely, the second duration. Alternatively, after detecting the ambient light, the ambient light sensor sends an interrupt signal to the processor, so that the processor controls the display screen to refresh the first area and the other areas and display the second frame of image frame picture.

Figure 5B:
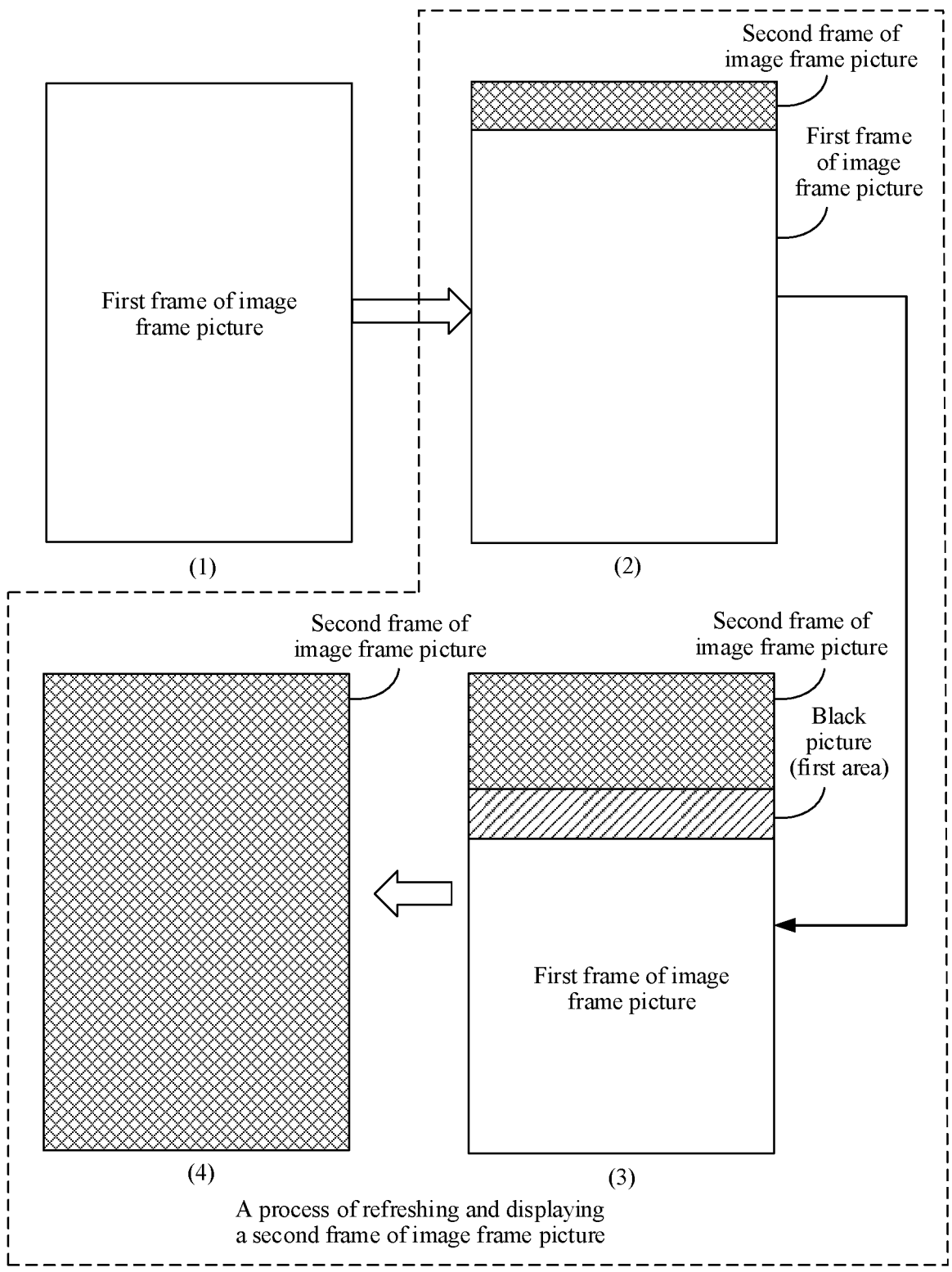
FIG. 5b is a schematic diagram of refreshing a picture by a terminal according to this application.

In another possible implementation, the terminal refreshes and displays a picture in sequence from a top portion of the display screen to a bottom portion of the display screen. It is assumed that the first area of the terminal is located in a non-top portion of the display screen. As shown in (1) in FIG. 5b, it is assumed that the display screen is currently displaying a first frame of image frame picture. The terminal controls the display screen to start refreshing and displaying the second frame of image frame picture from the top portion, as shown in (2) in FIG. 5b. At the first moment, the terminal starts controlling the first area of the display screen to display the black picture, and completely display the black picture after the time period $\Delta T$, namely, at the second moment. As shown in (3) in FIG. 5b, the terminal controls the ambient light sensor to start detecting the ambient light. After detection is completed, the terminal controls the first area of the display screen to display the second frame of image frame picture, and continues to refresh an area below the first area and display the second frame of image frame picture. As shown in (4) in FIG. 5b, all display areas are refreshed and the second frame of image frame picture is displayed.

In another possible implementation, the terminal may refresh and display a picture in a non-sequential manner. The terminal may first refresh the first area to display the black picture. It is assumed that the first area is located in a non-top portion of the terminal. As shown in (1) in FIG. 5c, the display screen is currently displaying a first frame of image frame picture. At the first moment, the terminal starts controlling the first area of the display screen to display the black picture, and completely display the black picture after the time period ΔT, namely, at the second moment. As shown in (2) in FIG. 5c, a display user interface of the terminal at the second moment is displayed. As shown in (2) in FIG. 5c, the first area presents the black picture, and the other areas present the first frame of image frame picture. At or after the second moment, the processor outputs a trigger signal used to instruct the ambient light sensor to start detecting the ambient light. The trigger signal may be a software instruction, or may be a physical interrupt signal. This is not limited in this embodiment of this application.

Figure 5C:
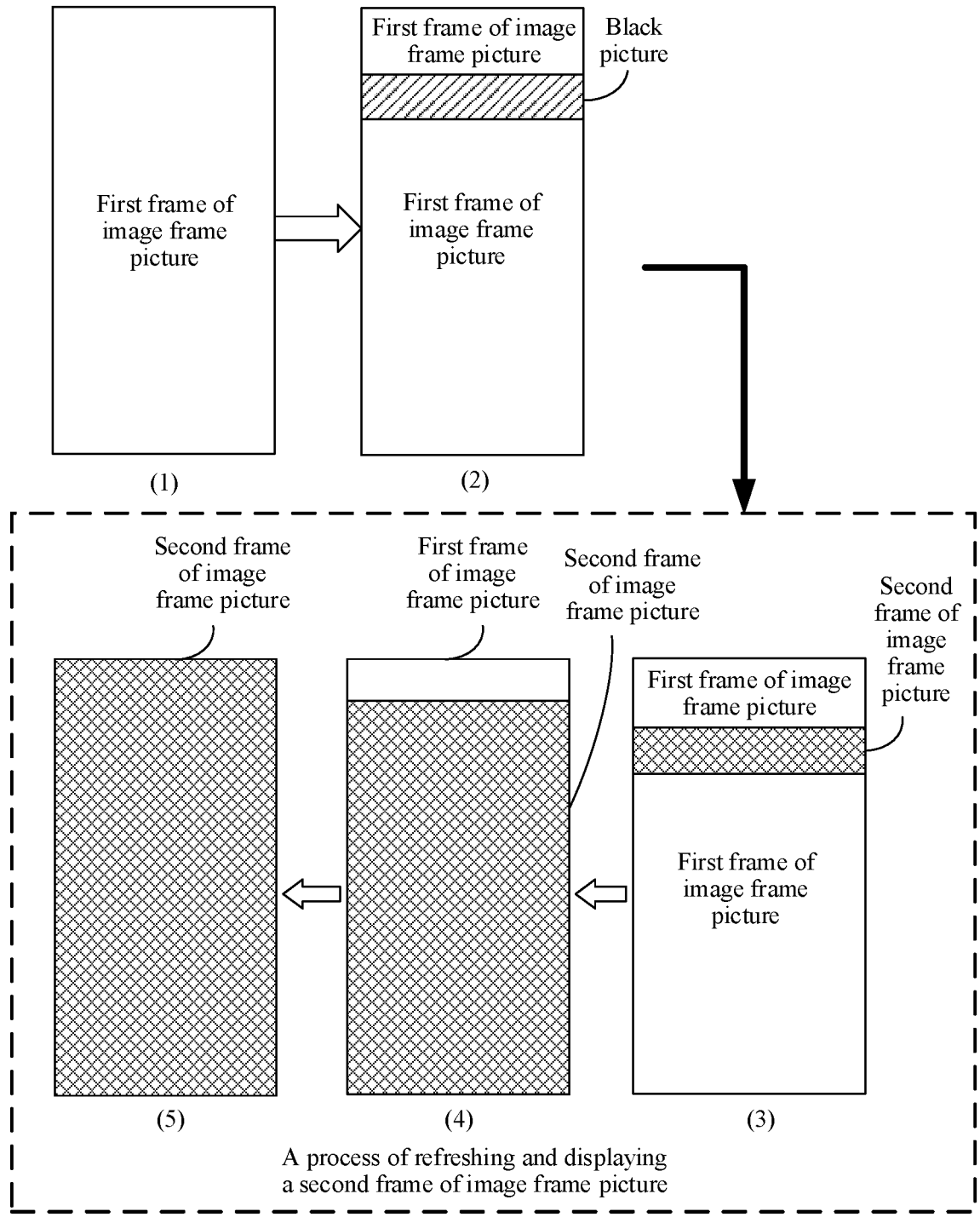
FIG. 5c is a schematic diagram of refreshing a picture by a terminal according to this application.

Further, after waiting for a specific time period, the processor may control the display screen to refresh the first area and display a second frame of image frame picture, as shown in (3) in FIG. 5c. The processor continues to refresh an area below the first area and display the second frame of image frame picture, as shown in (4) in FIG. 5c. The processor refreshes an area above the first area to display the second frame of image frame picture, as shown in (5) in FIG. 5c. The specific time period is a time period used by the ambient light sensor to detect the ambient light, namely, the second duration. Alternatively, after detecting the ambient light, the ambient light sensor sends an interrupt signal to the processor to notify the terminal that detection is completed. Then, the processor controls the display screen to continue to refresh the first area and a non-first area and display the second frame of image frame picture.

It should be noted that the first area cannot keep displaying the black picture for a long time, in other words, the first duration cannot be too long. Otherwise, the user may perceive the black picture. This affects user experience. Therefore, the ambient light sensor needs to complete integral detection of the ambient light within a limited time. Therefore, the ambient light sensor needs to have a capability of completing detection within a millisecond- or microsecond-level integral time. If the integral time of the ambient light sensor in the terminal is short, when the time period in which the first area displays the black picture is a multiple of detection time of the ambient light sensor, in other words, the first duration is at least two times the second duration, the terminal may control the ambient light sensor to detect the ambient light for a plurality of times in the first duration. Then, the terminal may automatically adjust the luminance of the screen based on an average value of intensities of the ambient light detected for the plurality of times.

S103: The terminal adjusts the luminance of the display screen based on ambient light detection data.

Specifically, the ambient light detection data includes the intensity of the ambient light and the like. The terminal adjusts the luminance of the display screen based on the ambient light detection data and according to a preset light adjustment policy. This improves user experience.

For example, the terminal uses the ambient light sensor to detect the ambient light. The ambient light sensor includes a photosensitive diode, an analog-to-digital converter, and a control circuit. Specifically, the photosensitive diode converts an external ambient light signal into a voltage signal through optical-to-electrical conversion, to generate an analog voltage signal. Then, the analog-to-digital converter converts the analog voltage signal into a digital signal, and sends the digital signal to the control circuit. The control circuit reads data of the analog-to-digital converter at a specific interval, and processes the data and sends the data to the terminal. This interval is generally referred to as integral time of the ambient light sensor. The integral time may be set based on an actual requirement, the photosensitive diode, and the analog-to-digital converter.

It should be noted that, in this embodiment of this application, the first area of the display screen displays the black picture for the plurality of times, so that the terminal can obtain one or more ambient light detection results in a process of refreshing one frame of picture. The terminal may automatically adjust the luminance of the display screen based on each ambient light detection result. Alternatively, after performing averaging, obtaining a median value, or performing other processing on the plurality of ambient light detection results within a time period, the terminal may automatically adjust the luminance of the display screen based on a processing result. A method for adjusting the luminance of the display screen by the terminal based on the ambient light detection result is not limited in this embodiment of this application.

According to the ambient light detection method provided in this embodiment of this application, the terminal controls the first area of the display screen to display the black picture for a plurality of times. When the first area displays the black pictures, the terminal controls the ambient light sensor to detect the ambient light, and automatically adjusts the luminance of the display screen based on the detection result of the ambient light sensor. This improves user experience. In addition, the terminal controls the first area to display the image frame picture in the interval between consecutively displaying the black picture in the first area for two times, so that the entire display screen of the terminal can be used to display the image frame picture. This improves user experience.

Further, when the terminal controls the first area of the display screen to display the black picture for the plurality of times, the image frame picture displayed in the first area becomes sometimes bright and sometimes dark. This may be perceived by sensitive human eyes and affect user experience.

Therefore, the terminal may increase a drive current intensity of the first area, to increase luminance of displaying the image frame picture in the first area. In this way, display luminance of the first area is the same as luminance of the other areas of the display screen. This improves user experience.

Alternatively, the terminal may appropriately display the black picture at positions other than the first area, so that the first area does not become sometimes bright and sometimes dark. This improves user experience.

The following describes a refresh policy used by the terminal to display the black picture also for a plurality of times at other positions other than the first area. The refresh policy is specifically as follows.

After the automatic ambient light-based adjustment function is enabled on the terminal, the terminal controls the first area to display the black picture for at least two times. The terminal controls the first area to display the image frame picture in the interval between consecutively displaying the black picture in the first area for the at least two times. When the first area displays the black picture for the at least two times, the terminal obtains the intensity of the ambient light detected by the first ambient light sensor. When the first area displays the black picture, the terminal controls a second area to display the image frame picture. In addition, the terminal further controls the second area to display the black picture for a plurality of times. When the second area displays the black picture, the terminal controls the first area to display the image frame picture. In the interval between consecutively displaying the black picture in the second area for two times, the terminal controls the second area to display the image frame picture.

The second area may be all or a part of another display area, other than the first area, on the display screen. A size of the second area may be greater than or equal to a size of the first area. In addition, the display screen of the terminal may include a plurality of second areas.

For example, it is assumed that the terminal currently displays the first frame of image frame picture. When refreshing the second frame of image frame picture, the terminal first displays a part of the black picture. A size of the part of the black picture is greater than or equal to the size of the first area. The terminal then displays the black picture in a next area of the same size, and displays the second frame of image frame picture in an area that just displays the black picture. The terminal continuously moves downward to an area for displaying the black picture until the display screen displays the entire second frame of image frame picture. In this way, the terminal continuously refreshes and displays a third frame of image frame picture, a fourth frame of image frame picture, and the like.

This embodiment of this application provides three refresh policies: a first policy, a second policy, and a third policy. Details are as follows.

Figure 7A:
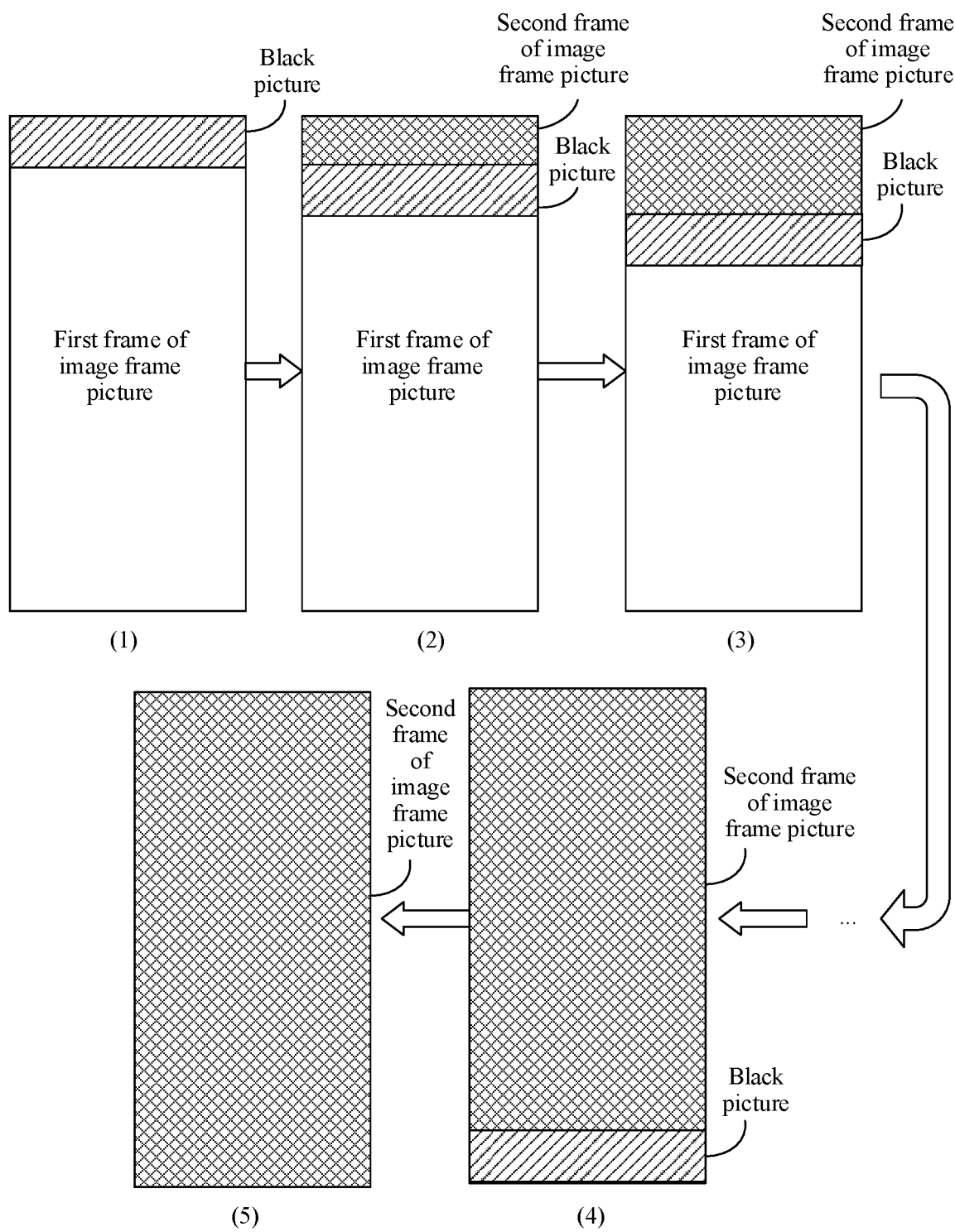
FIG. 7a is a schematic diagram of refreshing a picture by a terminal according to this application.

For example, FIG. 7a shows a schematic diagram of a process in which the terminal refreshes a picture. This may be marked as the first policy. It is assumed that the terminal currently displays the first frame of image frame picture, and displays the black picture in an area that has a same size as the first area from the top portion of the display screen, as shown in (1) in FIG. 7a. It is assumed that the ambient light sensor is located in the top portion of the display screen, and an area that is refreshed for the first time to display the black picture is the first area. After the first area displays the black picture, the processor notifies the ambient light sensor to perform detection. After detection by the ambient light sensor is completed, the terminal controls the display screen to refresh the first area and display the second frame of image frame picture, and refresh an area (namely, the second area) that is below the first area and that has a same size as the first area and display the black picture, as shown in (2) in FIG. 7a. By analogy, the terminal starts refreshing the area that has displayed the black picture to display the second frame of image frame picture, and continuously moves downward to an area for displaying the black picture (as shown in (3) and (4) in FIG. 7a) until the display screen displays the entire second frame of image frame picture, as shown in (5) in FIG. 7a. If the ambient light sensor is located at another position on the display screen, the refresh policy may remain unchanged, but the ambient light sensor is notified to perform detection at a different time point. According to the refresh policy, the other areas different from the first area also display the black picture for the plurality of times. The second area may be a part or all of the other areas different from the first area. This is not limited in this embodiment.

It should be noted that, the display screen may first refresh an original area that displays the black picture and display the second frame of image frame picture, and refresh an area below the area and display the black picture. Alternatively, the two refresh steps may be simultaneously performed. This is not limited in this embodiment of this application.

It should be further noted that, if a size of the display area of the display screen is an integer multiple of the size of the first area, a size of an area that finally displays the black picture is exactly equal to the size of the first area, as shown in (4) in FIG. 7a. If the size of the display area of the display screen is not an integer multiple of the size of the first area, and the size of the area that finally displays the black picture is less than the size of the first area, a time period of finally displaying the black picture may be prolonged, so that the time period is the same as that of previously displaying the black picture. The luminance remains unchanged and this improves user experience.

Figures 1, 7B:
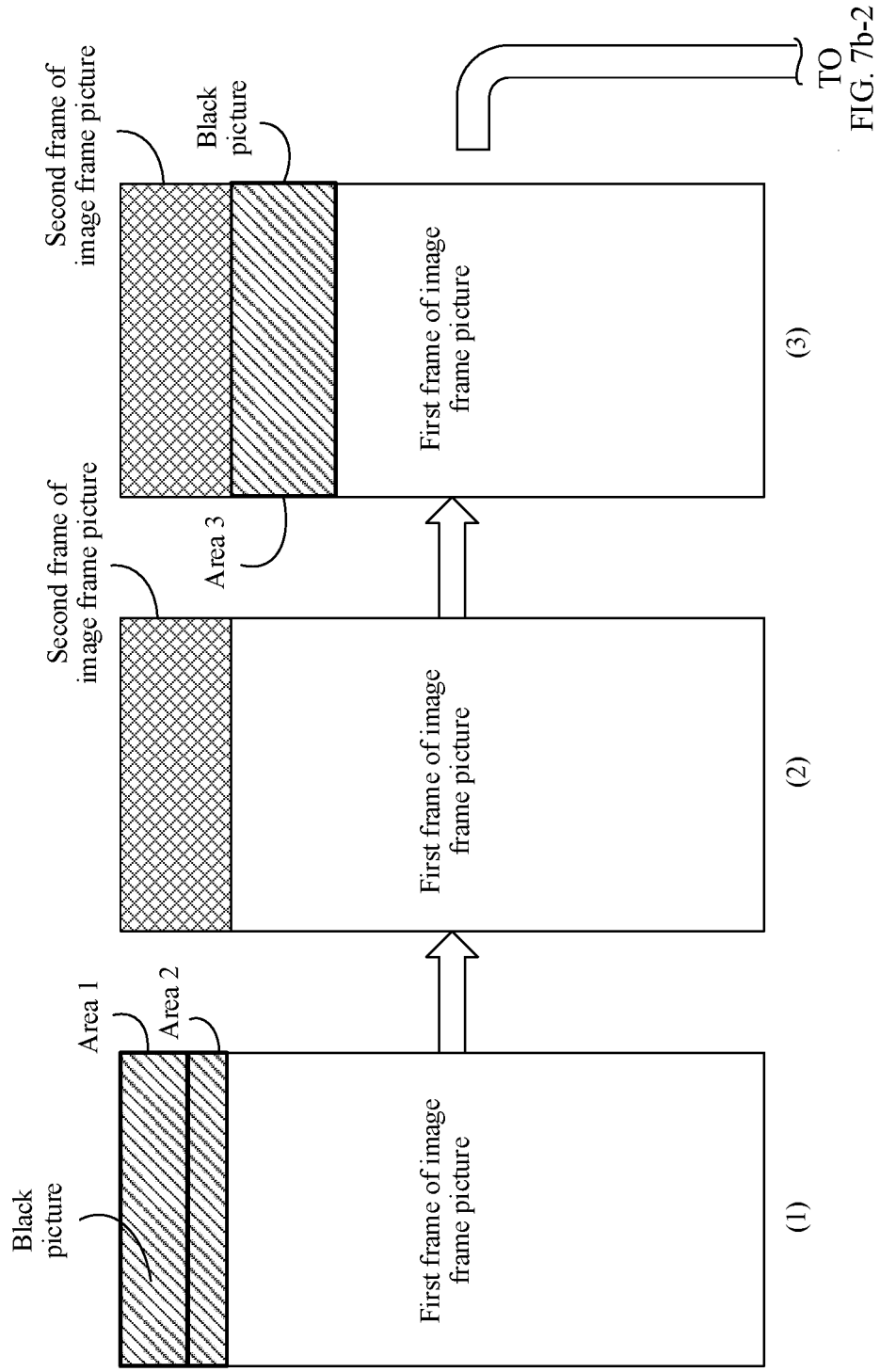
FIG. 7b-1 and FIG. 7b-2 are a schematic diagram 6 of refreshing a picture by a terminal according to this application.
Figures 2, 7B:
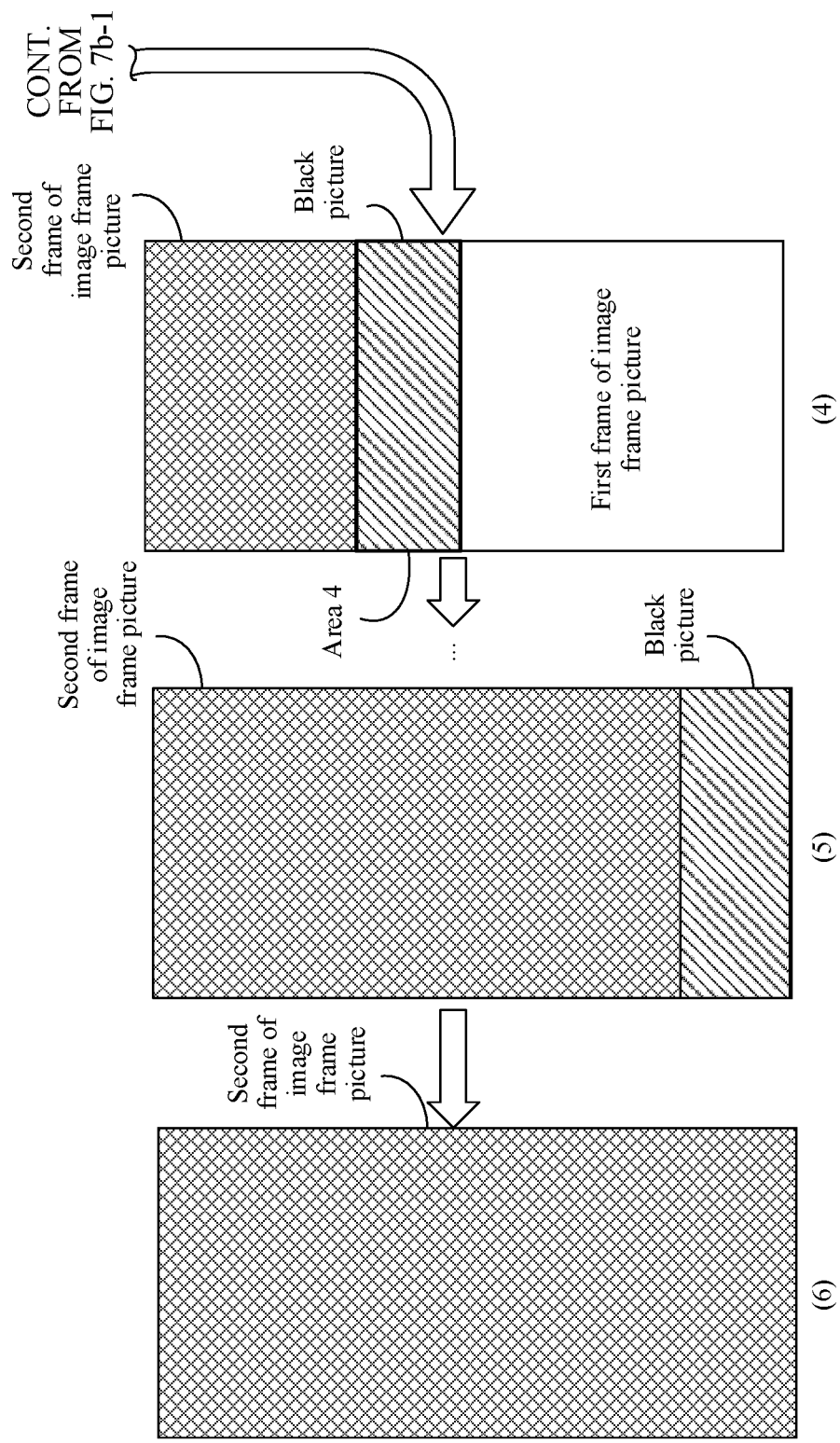

For example, FIG. 7b-1 and FIG. 7b-2 show a schematic diagram of another process in which the terminal refreshes a picture. This may be marked as the second policy. It is assumed that the terminal currently displays the first frame of image frame picture. The terminal displays the black picture in an area that has a same size as the first area from the top portion of the display screen. The area is marked as an area 1. It is assumed that the ambient light sensor is located in the top portion of the display screen, and the area 1 is the first area. After the first area displays the black picture, the processor notifies the ambient light sensor to perform detection. At the same time, when the first area displays the black picture, the processor controls the display screen to continue to refresh an area 2 and display the black picture, as shown in (1) in FIG. 7b-1. The processor controls a time period of refreshing and displaying the black picture in the area 2 to be greater than or equal to a time period of detecting the ambient light by the ambient light sensor. After detection by the ambient light sensor is completed, in other words, after the area 2 displays the black picture, the processor controls to refresh the area 1 and the area 2 and display the second frame of image frame picture, as shown in (2) in FIG. 7b-1. Further, the processor controls an area 3 below the area 1 and the area 2 to display the black picture, as shown in (3) in FIG. 7b-1. A size of the area 3 may be the same as a sum of sizes of the area 1 and the area 2 By analogy, the terminal starts refreshing the area that has displayed the black picture to display the second frame of image frame picture, and continuously moves downward to a position for displaying the black picture, as shown in (3) in FIGS. 7b-1, and (4) and (5) in FIG. 7b-2, until the display screen displays the entire second frame of image frame picture, as shown in (6) in FIG. 7b-2. If the ambient light sensor is located at another position on the display screen, the refresh policy may remain unchanged, but the ambient light sensor is notified to perform detection at a different time point. According to the refresh policy, the other areas (such as the area 3 and an area 4) different from the first area display the black picture for the plurality of times. The second area may be a part or all of the other areas different from the first area. For example, the second area may be the area 3, the area 4, the area 3 and the area 4, or the like. This is not limited in this embodiment.

It should be noted that, the display screen may first refresh an original area that displays the black picture and display the second frame of image frame picture, and refresh an area below the area and display the black picture. Alternatively, the two refresh steps may be simultaneously performed. This is not limited in this embodiment of this application.

It should be noted that, if a size of the display area of the display screen is an integer multiple of a sum of sizes of the area 1 and the area 2, a size of an area that finally displays the black picture is exactly equal to the sum of the sizes of the area 1 and the area 2, as shown in (4) in FIG. 7b-2. If the size of the display area of the display screen is not an integer multiple of the sum of the sizes of the area 1 and the area 2, and the size of the area that finally displays the black picture is less than the sum of the sizes of the area 1 and the area 2, a time period of finally displaying the black picture may be prolonged, so that the time period is the same as that of previously displaying the black picture. The luminance remains unchanged and this improves user experience.

FIG. 11 FIG. 11A, FIG. 11B, and FIG. 11C show a schematic diagram of still another process in which the terminal refreshes a picture. This may be marked as the third policy. Specifically, it is assumed that the terminal currently displays the first frame of image frame picture. The terminal displays the black picture in an area that has a same size as the first area from the top portion of the display screen, as shown in (1) in FIG. 11A. A black picture that is first displayed may be marked as a first black picture. It is assumed that the ambient light sensor is located in the top portion of the display screen, and an area that is refreshed and displays the black picture for the first time is marked as the first area. The terminal moves downward to a position for displaying the first black picture, and an original position that displays the first black picture starts displaying the second frame of image frame picture, as shown in (2) in FIG. 11A. As shown in (3) in FIG. 11A, the terminal continuously moves downward to a position for displaying the first black picture, until a specific position on the display screen displays the first black picture. For example, the specific position may be a central position in a longitudinal direction of the display screen, as shown in (4) in FIG. 11B. After the specific position displays the first black picture, the terminal continuously moves downward to a position for displaying the first black picture. At the same time, a position in the top portion of the display screen starts to display a new black picture, which may be marked as a second black picture. It should be noted that, the picture currently displayed on the display screen includes two black pictures: the first black picture and the second black picture. The terminal continuously moves downward to positions for separately displaying the first black picture and the second black picture on the display screen, and the original positions for displaying the two black pictures continue to display the second frame of image frame picture, until a bottom portion of the display screen displays the first black picture, as shown in (6) in FIG. 11C. As shown in (7) in FIG. 11C, the terminal continuously moves downward to a position for displaying the second black picture, and a position in the top portion of the display screen displays a new black picture again, which may be marked as a third black picture. As shown in (8) in FIG. 11C, the terminal continuously moves downward to positions for displaying the second black picture and the third black picture, the original position for displaying the second black picture displays the second frame of image frame picture, and the original position for displaying the third black picture starts displaying a third frame of image frame picture. The terminal continuously moves downward to positions for displaying the second black picture and the third black picture. This refresh mechanism is continuously repeated subsequently. It should be noted that the first black picture, the second black picture, and the third black picture herein are merely used for ease of description. Whether the three black pictures are the same is not limited. According to the third policy, two areas of the display screen may simultaneously display black pictures at a moment, for example, the simultaneously displayed first black picture and the second black picture, or the simultaneously displayed second black picture and the third black picture. The second area may be a part or all of the other areas different from the first area. This is not limited in this embodiment.

It should be noted that, in a refresh process according to the policy 3, when the first area displays the black picture, the terminal starts performing ambient light detection. For a specific detection method, refer to the foregoing detection method. Details are not described herein again. It should be noted that, in a refresh method according to the policy 3, within a time period of refreshing a frame of picture, the terminal displays black pictures in the first area for two time periods, within which the ambient light may be detected. The terminal may perform detection in the two time periods or in one of the time periods. This is not limited in this embodiment of this application. If the terminal detects the ambient light both within the two time periods, it is equivalent to that the terminal detects the ambient light for two times within the time period of refreshing a frame of picture. In this way, the terminal does not detect positions with a same intensity of the ambient light, for example, positions with highest or lowest light intensity, the display screen being adjusted does not become comparatively bright or dark. This improves user experience.

It should be noted that, to illustrate a display effect, "moving downward to a position for displaying the black picture" is described in descriptions of the refresh policies. To implement moving downward to a position for displaying the black picture, the terminal sequentially controls different areas from top to bottom to display the black picture. Each area displays the black picture for a plurality of times or periodically displays the black picture.

Figure 12:
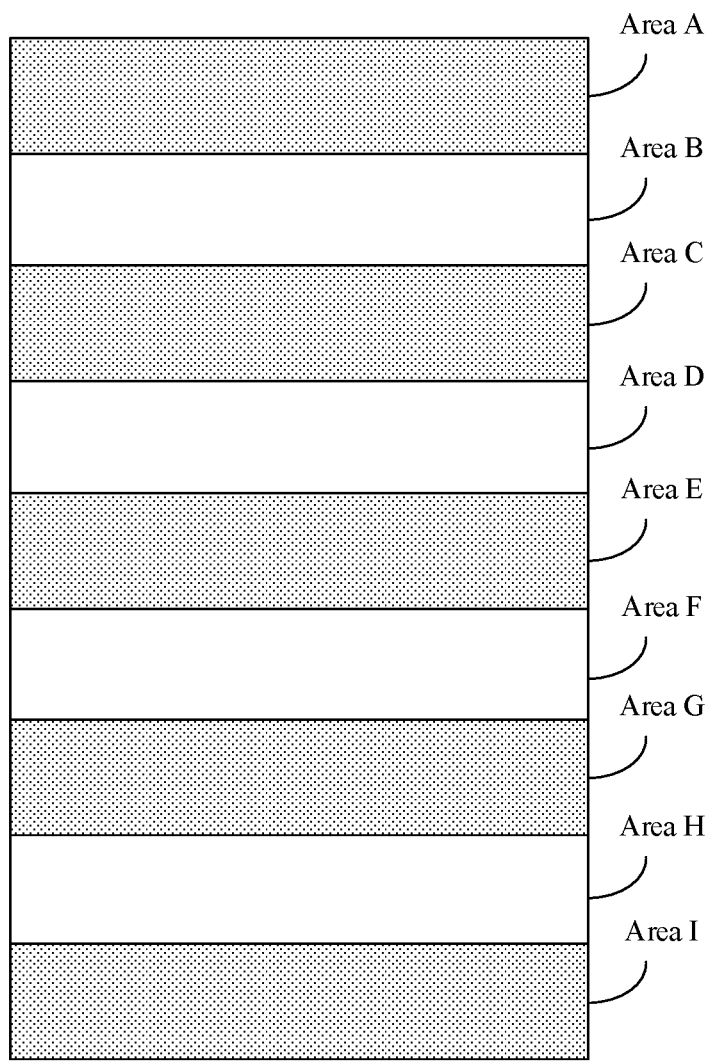
FIG. 12 is a schematic diagram of refreshing a picture by a terminal according to this application.

As shown in FIG. 12, the display area of the display screen of the terminal may be divided into a plurality of areas whose sizes are the same as the size of the first area. The areas are respectively marked as an area A, an area B, an area C, and the like. In a process in which the terminal controls the areas of the terminal to periodically display the black picture, the terminal may move downward to a position for displaying the black picture as follows: The terminal controls the area A of the display screen to display black, controls the area A of the display screen to display the image frame picture after a time period, and controls the area B to display the black picture. Then, the terminal controls the area B of the display screen to display the image frame picture after a time period, and controls the area C to display the black picture. Further, the terminal controls the area C of the display screen to display the image frame picture after a time period, and controls the area D to display the black picture. By analogy, until the terminal controls an area I of the display screen to display the black picture, and controls the area I of the display screen to display the image frame picture after a time period.

EXAMPLE 2

Figure 8:
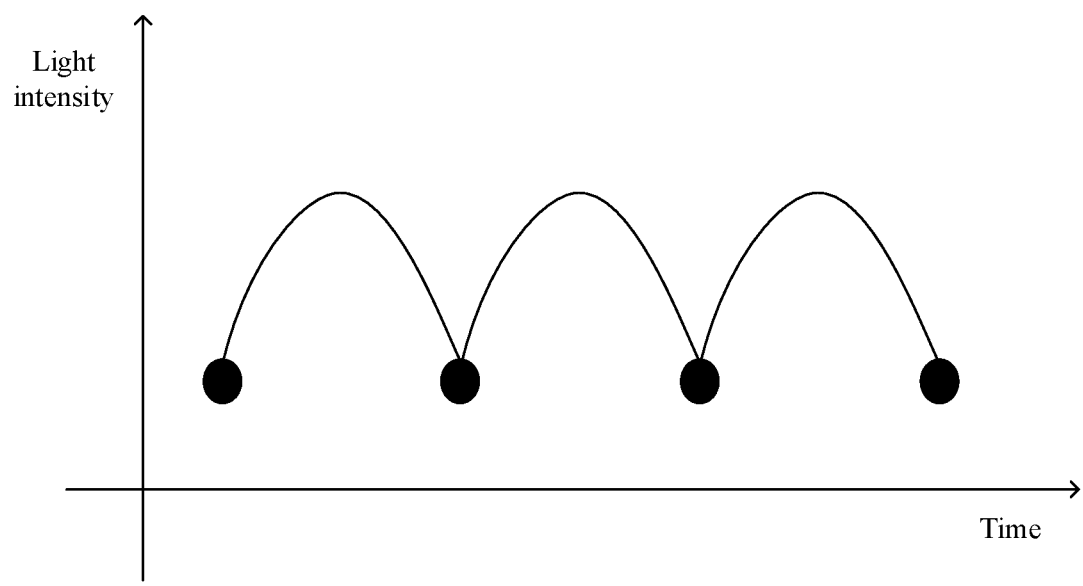
FIG. 8 is a schematic diagram of a correspondence between detection time of an ambient light sensor and light intensity according to this application.
Figure 9:
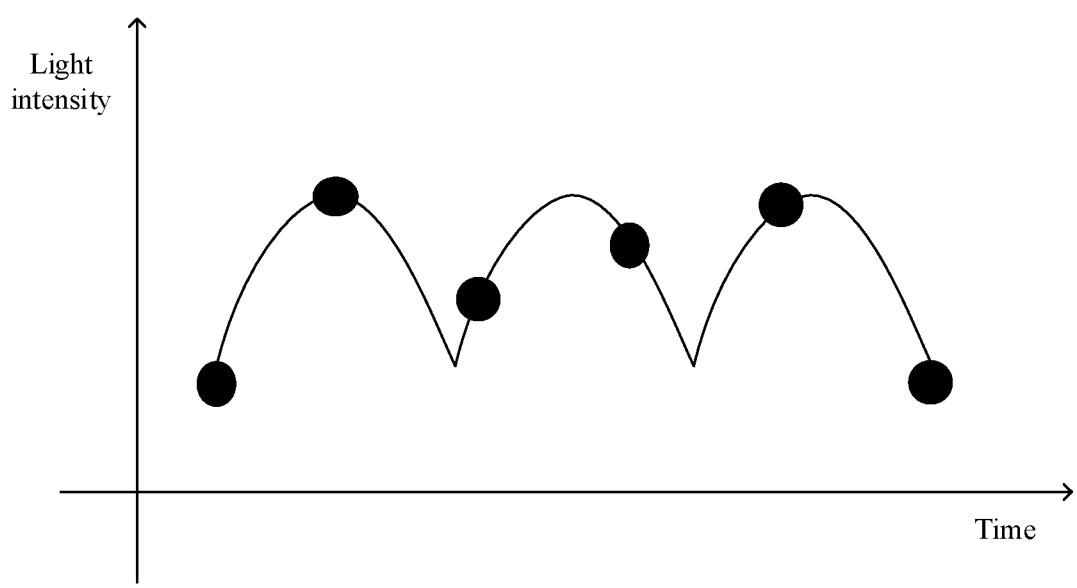
FIG. 9 is a schematic diagram of a correspondence between detection time of an ambient light sensor and light intensity according to this application.

An envelope phenomenon may occur if a flicker frequency of ambient light is the same as or approximate to a display frequency of a terminal. As shown in FIG. 8, a waveform diagram in FIG. 8 is a light intensity trend diagram of ambient light. If the display frequency of the terminal is the same as the flicker frequency of the ambient light, when the ambient light is detected once in one frame of picture, the terminal may detect positions with a same intensity of the ambient light, for example, positions with highest or lowest light intensity. When the terminal adjusts luminance of a display screen based on detection data, the display screen may be comparatively bright or dark. Therefore, in this embodiment of this application, the terminal may further use two or more ambient light sensors to detect the ambient light for two or more times in one frame of picture, to improve detection data accuracy.

The following describes by using an example in which the terminal has two ambient light sensors.

In this embodiment, the terminal has two ambient light sensors: a first ambient light sensor and a second ambient light sensor. A display area of the display screen includes a first area and a second area. The first area covers a receiving area of the first ambient light sensor. In other words, the first area is an area in which the first ambient light sensor receives ambient light when the first ambient light sensor works. The second area covers a receiving area of the second ambient light sensor. In other words, the second area is an area in which the second ambient light sensor receives ambient light when the second ambient light sensor works. A size of the second area is not limited in this embodiment, provided that the second area can cover the receiving area.

An ambient light detection method provided in this embodiment may include the following process.

The terminal controls the first area to display a black picture for at least two times, and controls the first area to display an image frame picture in an interval between consecutively displaying the black picture in the first area for two times. When the first area displays the black picture for the at least two times, the terminal obtains an intensity of the ambient light detected by the first ambient light sensor. When the first area displays the black picture, the terminal controls the second area to display the image frame picture. The terminal further controls the second area to display the black picture for a plurality of times. When the second area displays the black picture, the terminal obtains an intensity of the ambient light detected by the second ambient light sensor. The terminal automatically adjusts the luminance of the display screen separately based on the intensities of the ambient light detected by the second ambient light sensor and the first ambient light sensor.

The two ambient light sensors are disposed at a spacing from each other on a rear side of the display screen. For example, as shown in FIG. 2b, one ambient light sensor is disposed in a top portion of the display screen, and the other ambient light sensor is disposed at a middle position in a longitudinal direction of the display screen. In this case, when the terminal refreshes by using a policy 1, a policy 2, or a policy 3 in Embodiment 1, the black picture sequentially covers light receiving areas of the two ambient light sensors, and the terminal also sequentially notifies the two ambient light sensors to detect the ambient light. Therefore, in a process of displaying one frame of picture, the terminal may have two time periods for detecting the ambient light, to obtain two pieces of detection data.

It should be noted that the terminal automatically adjusts the luminance of the display screen based on the obtained intensities of the ambient light detected by the first ambient light sensor and the second ambient light sensor. For a specific adjustment method, refer to description in Embodiment 1. Details are not described herein again.

It should be noted that, for processes in which the first area and the second area display the black pictures for a plurality of times for a plurality of times, refer to description in Embodiment 1. Details are not described herein again.

For working processes of the first ambient light sensor and the second ambient light sensor, refer to description in Embodiment 1. Details are not described herein again.

It should be further noted that, when the terminal has one or more ambient light sensors, the terminal may further increase the display frequency, so that there is a phase difference between the display frequency and a light source frequency of the ambient light, for example, a frequency of power-frequency current, to eliminate electrical interference from the power-frequency current. For example, currently the frequency of power-frequency current is 50 Hz or 60 Hz. In other words, the flicker frequency of the ambient light may be approximately 50 Hz or 60 Hz. A frequency error is generally ±1 Hz. Therefore, the display frequency of the terminal may be set to a value that is not 50 Hz or a multiple of 50 Hz, or a value that is not 60 Hz or a multiple of 60 Hz. In this way, there is a phase difference between the display frequency and a flicker frequency of the ambient light. For example, the display frequency of the terminal is set to 61 Hz, 63 Hz, or the like.

Specifically, the terminal uses a first display frequency when the user does not enable the function of automatically adjusting the luminance of the screen based on the ambient light. The first display frequency may be any value. The terminal uses a second display frequency when the user enables the function of automatically adjusting the luminance of the screen based on the ambient light. There is a phase difference between the second display frequency and the frequency of the power-frequency current, to eliminate impact of a light source generated by the power-frequency current, and enhance automatic adjustment of an intensity of the screen by the terminal. This improves user experience.

In this way, the terminal detects positions with different intensities of the ambient light in each frame, the obtained detection data can reflect an intensity change trend of the ambient light, and therefore the display screen can be better adjusted based on the detection data. This improves user experience.

It can be understood that, to implement the foregoing functions, the terminal and the like include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of the present invention, division into modules is an example, is merely logical function division, and may be other division in an actual implementation.

Figure 13:
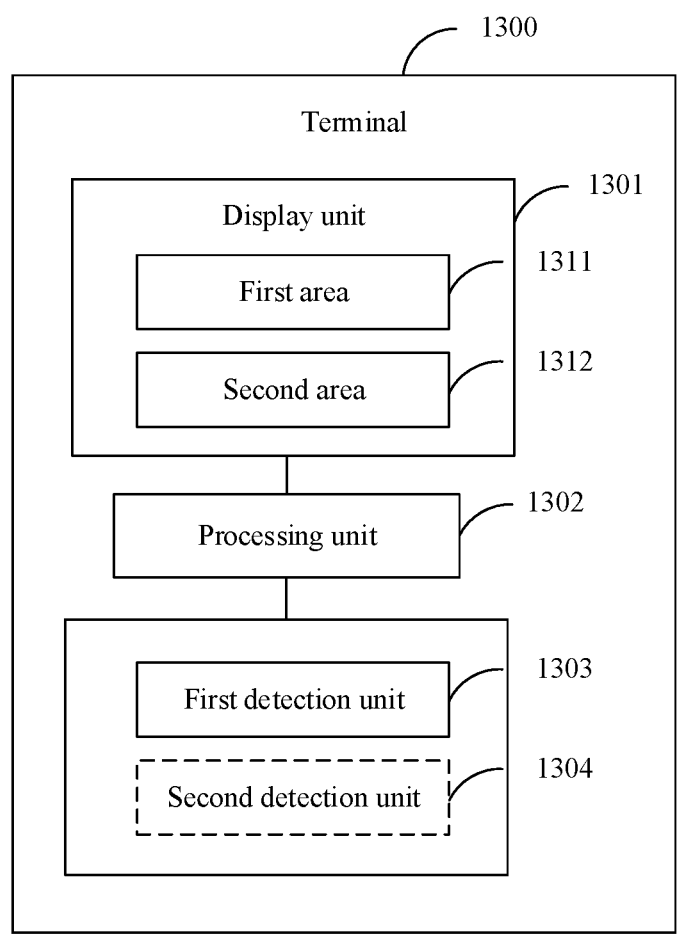
FIG. 13 is a schematic diagram of structural composition of a terminal according to this application.

When functional modules corresponding to various functions are obtained through division, FIG. 13 is a schematic diagram of a possible structure of a terminal in the foregoing embodiments. As shown in FIG. 13, a terminal 1300 includes a display unit 1301, a processing unit 1302, and a first detection unit 1303. The display unit 1301 further includes a first area 1311 and a second area 1312. The first area 1311 includes an area used by the first detection unit 1303 to receive ambient light, and the first area 1312 is at least a part of an area, other than the first area 1311, of the display unit 1301.

The processing unit 1302 is configured to control the first area 1311 of the display unit 1301 to display a black picture for at least two times. When the first area 1311 displays the black picture, the processing unit 1302 is further configured to control the first area 1312 to display an image frame picture. The processing unit 1302 is further configured to control the first area 1311 to display the image frame picture in an interval between consecutively displaying the black picture in the first area 1311 for two times. When the first area 1311 displays the black picture, the processor is further configured to obtain an intensity of the ambient light detected by the first detection unit. Displaying the black picture for the at least two times may be periodically displaying the black picture.

Optionally, the processing unit 1302 is further configured to automatically adjust luminance of a display screen based on the intensity of the ambient light detected by the first detection unit 1303.

Optionally, the processing unit 1302 is further configured to: when the terminal runs a first-type application, increase the interval between consecutively displaying the black picture in the first area for any two times, or when the first area always displays the image frame picture, disable an ambient light-based adjustment function.

Optionally, the processing unit 1302 is further configured to: when an obtained movement speed of the terminal is greater than a preset threshold, increase the interval between consecutively displaying the black picture in the first area for any two times, or control the first area to always display the image frame and disable the ambient light-based adjustment function.

Optionally, the processing unit 1302 is further configured to: when the first area displays the black picture, control, by the terminal, the first detection unit 1303 to detect the intensity of the ambient light. The processing unit 1302 is further configured to read the intensity of the ambient light detected by the first ambient light sensor.

Optionally, the processing unit 1302 is further configured to: when the first area displays the black picture or the image frame picture, control the first ambient light sensor to detect the intensity of the ambient light. The processing unit 1302 is further configured to: when the first area displays the black picture, read the intensity of the ambient light detected by the first ambient light sensor.

Optionally, the processing unit 1302 is further configured to: when a display frequency of the terminal is f Hz, control the interval between consecutively displaying the black picture in the first area for two times to be greater than or equal to $1/(a \times f)$ seconds, where a is a positive integer greater than or equal to 1.

Optionally, the processing unit 1302 is further configured to control the second area to display the black picture for at least two times, where when the second area displays the black picture, the first area displays the image frame picture. The processing unit 1302 is further configured to control, in an interval between consecutively displaying the black picture in the second area for two times, the second area to display the image frame picture.

Optionally, the terminal further includes a second detection unit 1304. The second area includes an area used by a second ambient light sensor to receive ambient light.

Optionally, the processing unit 1302 is further configured to: when the second area displays the black picture, obtain an intensity of the ambient light detected by the second ambient light sensor. The processing unit 1302 is further configured to automatically adjust the luminance of the display screen based on the intensity of the ambient light detected by the second ambient light sensor.

Optionally, the processing unit 1302 is further configured to: when the second area displays the black picture, control a lower portion of the second area to display an $n^{th}$ frame of image frame picture, and an upper portion of the second area to display an $(n+1)^{th}$ frame of image frame picture; or when the second area displays the black picture, control a lower portion of the second area to display an $n^{th}$ frame of image frame picture, and an upper portion of the second area to display the $n^{th}$ frame of image frame picture.

Optionally, the processing unit 1302 is further configured to: when controlling the first area to display the black picture, turn off a light emitting unit in the first area of the display screen.

Optionally, the processing unit 1302 is further configured to: when controlling the second area to display the black picture, turn off a light emitting unit in the second area of the display screen.

Optionally, the processing unit 1302 is further configured to control the display frequency and a frequency of power-frequency current of the display screen to form a phase difference.

All related content of the steps in the foregoing method embodiments may be cited in function descriptions of corresponding functional modules. Details are not described herein again.

Certainly, the terminal 1300 may further include a storage unit, configured to store program code, data, and the like. The terminal 1300 may further include a communications unit, used by the terminal to interact with another device. In addition, functions that can be specifically implemented by the functional units include but are not limited to functions corresponding to the method steps in the foregoing examples. For detailed description of other units of the terminal 1300, refer to the detailed descriptions of the method steps corresponding to the units. Details are not described herein again.

When an integrated unit is used, the processing unit may be a processor in the terminal. The display unit may be a display module, for example, the display screen. The first detection unit and the second detection unit may be ambient light sensors. The communications unit may be a communications module in the terminal, for example, an RF circuit, a Wi-Fi module, or a Bluetooth module. The storage unit may be a memory in the terminal.

Figure 14:
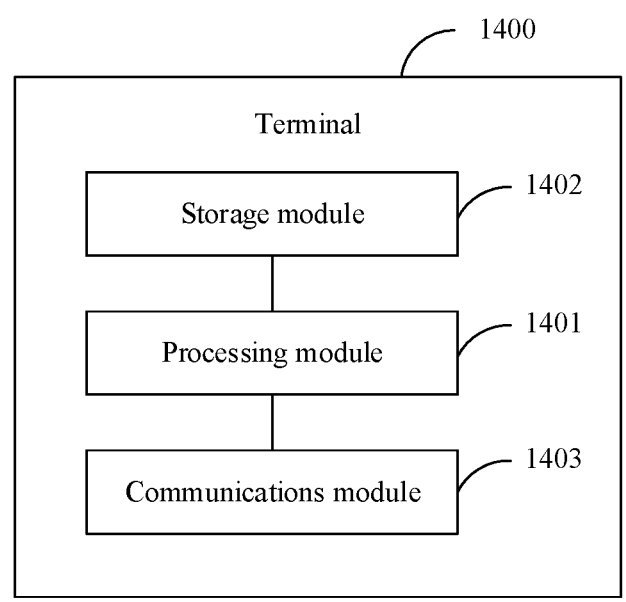
FIG. 14 is a schematic diagram of structural composition of a terminal according to this application.

FIG. 14 is a schematic diagram of a possible structure of the terminal used in the foregoing embodiments. The terminal 1400 includes a processing module 1401, a storage module 1402, and a communications module 1403. The processing module 1401 is configured to perform control management on an action of the terminal. The storage module 1402 is configured to store program code and data of the terminal. The communications module 1403 is configured to communicate with another terminal. The processing module 1401 may be a processor or a controller, for example, a central processing unit (CPU), an MCU, a general-purpose processor, a digital signal processor (DSP), an application-specific integrated circuit (ASIC), a field programmable gate array (FPGA), or another programmable logical device, a transistor logical device, a hardware component, or any combination thereof. The controller/processor may implement or execute various example logical blocks, modules, and circuits described with reference to content disclosed in the present invention. The processor may also be a combination implementing a computing function, for example, a combination of one or more microprocessors, or a combination of a DSP and a microprocessor. The communications module 1403 may be a transceiver, a transceiver circuit, a communications interface, or the like. The storage module 1402 may be a memory. When the processor executes the program code stored in the memory, the terminal is enabled to perform any method described in the foregoing embodiments.

When the processing module 1401 is the processor (the processor 101 shown in FIG. 1a), the communications module 1403 is an RF transceiver circuit (the radio frequency circuit 102 shown in FIG. 1a), and the storage module 1402 is a memory (the memory 103 shown in FIG. 1), the terminal provided in this embodiment of the present invention may be the terminal 100 shown in FIG. 1a. The communications module 1403 may include not only the RF circuit, but also the Wi-Fi module and the Bluetooth module. A communications module such as an RF circuit, a Wi-Fi module, and a Bluetooth module may be collectively referred to as a communications interface. The processor, the communications interface, and the memory may be coupled together by using a bus.

EXAMPLE 3

The foregoing embodiments describe the ambient light sensor solution. An embodiment of this application further provides a plurality of optical proximity sensor solutions. Specifically, the ambient light sensor in the solutions provided in the foregoing embodiments may be replaced with an optical proximity sensor, and other components remain unchanged, to obtain the plurality of proximity detection solutions.

In the proximity detection solution provided in this embodiment of this application, a terminal works with an optical proximity sensor to complete proximity detection. Specifically, the terminal controls a part of a display screen corresponding to the optical proximity sensor to display a black picture, and the terminal obtains a detection result of an external object by the optical proximity sensor when the part of the display screen displays the black picture. In other words, the optical proximity sensor detects whether the external object is approaching. The terminal is controlled based on the detection result. When the terminal does not need proximity detection, the terminal may control the part of the display screen corresponding to the optical proximity sensor to display an image frame picture.

A proximity detection method provided in this embodiment of this application is applied to the terminal. The terminal includes the display screen and a first optical proximity sensor. The first optical proximity sensor is located under the display screen, and a display area of the display screen includes a first area and a second area. The first area includes an area that is used by the first optical proximity sensor to detect an external object, and the second area is at least a part of an area, other than the first area, in the display area. When the first optical proximity sensor detects the external object by transmitting an infrared ray, the first area is an area in which the first optical proximity sensor transmits and receives the infrared ray.

The proximity detection method may include: controlling, by the terminal, the first area to display a black picture for at least two times; controlling, by the terminal when the first area displays the black picture, the second area to display the image frame picture; controlling, by the terminal, the first area to display the image frame picture in an interval between consecutively displaying the black picture in the first area for two times; and when the first area displays the black picture, obtaining, by the terminal, data detected by the first optical proximity sensor.

Further, the controlling, by the terminal, the first area to display a black picture for at least two times includes: controlling, by the terminal, the first area to periodically display the black picture.

Further, a display frequency of the terminal is f Hz, and the interval between consecutively displaying, in the first area controlled by the terminal, the black picture for two times is greater than or equal to $1/(a \times f)$ seconds, where a is a positive integer greater than or equal to 1.

Further, duration of displaying the black picture each time is first duration, duration of detecting proximity of the external object by the optical proximity sensor is second duration, and the first duration is greater than or equal to the second duration.

Further, the image frame picture is a display user interface presented by the terminal to a user.

Further, the controlling, by the terminal, the first area to display a black picture for at least two times includes: controlling, by the terminal, the first area to display N black pictures within a first time period T1.

The controlling, by the terminal when the first area displays the black picture, the first optical proximity sensor to detect proximity of an external object includes: when M of the N black pictures are displayed, separately controlling, by the terminal, the first optical proximity sensor to detect for M times, where M is less than or equal to N.

Further, the method further includes: controlling, by the terminal, the second area to display the black picture for a plurality of times, where when the second area displays the black picture, the first area displays the image frame picture; and controlling, by the terminal, the second area to display the image frame picture in an interval between consecutively displaying the black picture in the second area for two times.

Further, the terminal further includes a second optical proximity sensor, and the second area includes an area that is used by the second optical proximity sensor to detect an external object. The method further includes: when the second area displays the black picture, obtaining, by the terminal, data detected by the second optical proximity sensor.

Further, the second optical proximity sensor is located in a middle portion of the display screen.

Further, the first optical proximity sensor is located in a top portion of the display screen.

Further, the method further includes: when the second area displays the black picture, controlling, by the terminal, a lower portion of the second area to display an $n^{th}$ frame of image frame picture, and an upper portion of the second area to display an $(n+1)^{th}$ frame of image frame picture; or when the second area displays the black picture, controlling, by the terminal, a lower portion of the second area to display an $n^{th}$ frame of image frame picture, and an upper portion of the second area to display the $n^{th}$ frame of image frame picture.

Further, the black picture includes a picture whose grayscale value is less than or equal to a preset threshold.

Further, when the terminal controls the first area to display the black picture, the terminal turns off a light emitting unit in the first area of the display screen.

Further, when the terminal controls the second area to display the black picture, the terminal turns off a light emitting unit in the second area of the display screen.

Further, the method further includes: controlling, by the terminal, the display frequency and a frequency of power-frequency current of the display screen to form a phase difference. Further, after the obtaining, by the terminal, data detected by the first optical proximity sensor, the method further includes: if the first optical proximity sensor detects that the external object is approaching, and the terminal is in a call, controlling, by the terminal, to turn off the display screen; or if the second optical proximity sensor detects that the external object is approaching, and the terminal is in a call, controlling, by the terminal, to turn off the display screen.

Further, the method further includes: when the first area displays the black picture and the image frame picture, the first optical proximity sensor is in a detection state.

The obtaining, by the terminal, data detected by the first optical proximity sensor includes: when the first area displays the black picture, reading, by the terminal, the data that is detected by the first optical proximity sensor.

An embodiment of this application further provides a terminal, including a processor, a memory, a display screen, and a first optical proximity sensor. The first optical proximity sensor is located under the display screen, and a display area of the display screen includes a first area and a second area. The first area includes an area that is used by the first optical proximity sensor to detect an external object, and the second area is at least a part of an area, other than the first area, in the display area. The memory and the display screen are coupled to the processor. The memory is configured to store computer program code. The computer program code includes a computer instruction, and when the processor executes the computer instruction, the terminal is enabled to perform the proximity detection method.

For details about the proximity detection solutions provided in this embodiment of this application, for example, a position of the sensor, display of the display screen, and working with the sensor to perform detection, refer to description in the foregoing embodiments. The ambient light sensor in the foregoing embodiments is replaced with the optical proximity sensor.

EXAMPLE 4

The foregoing embodiments describe the ambient light sensor and the optical proximity sensor solutions. An embodiment of this application further provides a terminal including a camera under a screen and a photographing method thereof. Specifically, in a structure, the ambient light sensor in the solutions provided in the foregoing embodiments may be replaced with a front-facing camera, to obtain the terminal including the camera under the screen.

According to the photographing method provided in this embodiment of this application, after the front-facing camera is turned on, the terminal controls a part of a display screen corresponding to the front-facing camera to display a black picture. When the terminal displays the black picture, the terminal controls the front-facing camera to perform exposure, to obtain and display a preview picture. For details about displaying the preview picture, refer to the foregoing method for displaying the black picture. When the preview picture is displayed, the terminal may further periodically obtain a new preview picture.

The photographing method provided in the embodiments of this application is applied to the terminal including the front-facing camera under the screen. The terminal includes the display screen and the front-facing camera. The front-facing camera is located under the display screen, and a display area of the display screen includes a first area and a second area. The first area includes an area in which a lens of the front-facing camera is located, and the second area is at least a part of an area, other than the first area, in the display area.

The photographing method may include: turning on, by the terminal, the front-facing camera; controlling, by the terminal, the first area to display a black picture for at least two times; when the first area displays the black picture, controlling, by the terminal, the front-facing camera to obtain a preview image; controlling, by the terminal when the first area displays the black picture, the second area to display an image frame picture; controlling, by the terminal, the first area to display the image frame picture in an interval between consecutively displaying the black picture in the first area for two times, where the image frame picture displayed in the first area and the second area is the preview image obtained by the front-facing camera; receiving a photographing instruction; where the photographing instruction may be manually triggered by a user, or may be actively triggered by the terminal in response to some events, for example, capturing a smiling face (when the terminal detects that there is a smiling face in the preview image, the terminal automatically triggers photographing); and controlling, by the terminal in response to the photographing instruction, the front-facing camera to perform photographing.

The photographing method includes the foregoing processes of obtaining the preview image and photographing.

Further, the controlling, by the terminal, the first area to display a black picture for at least two times includes: controlling, by the terminal, the first area to periodically display the black picture.

Further, a display frequency of the terminal is f Hz, and the interval between consecutively displaying, in the first area controlled by the terminal, the black picture for two times is greater than or equal to $1/(a \times f)$ seconds, where a is a positive integer greater than or equal to 1.

Further, duration of displaying the black picture each time is first duration, duration of performing exposure once by the front-facing camera is second duration, and the first duration is greater than or equal to the second duration.

Further, the image frame picture is a display user interface presented by the terminal to a user.

Further, the controlling, by the terminal, the first area to display a black picture for at least two times includes: controlling, by the terminal, the first area to display N black pictures within a first time period T1. when the first area displays the black picture, the controlling, by the terminal, the front-facing camera to obtain a preview image includes: when M of the N black pictures are displayed, separately controlling, by the terminal, the front-facing camera to obtain the preview image for M times, where M is less than or equal to N.

Further, the method further includes: controlling, by the terminal, the second area to display the black picture for a plurality of times, where when the second area displays the black picture, the first area displays the image frame picture; and controlling, by the terminal, the second area to display the image frame picture in an interval between consecutively displaying the black picture in the second area for two times.

Further, the front-facing camera is located a top portion or a middle portion of the display screen.

Further, the method further includes: when the second area displays the black picture, controlling, by the terminal, a lower portion of the second area to display an nth frame of image frame picture, and an upper portion of the second area to display an $(n+1)^{th}$ frame of image frame picture; or when the second area displays the black picture, controlling, by the terminal, a lower portion of the second area to display an nth frame of image frame picture, and an upper portion of the second area to display the nth frame of image frame picture.

Further, the black picture includes a picture whose grayscale value is less than or equal to a preset threshold.

Further, when the terminal controls the first area to display the black picture, the terminal turns off a light emitting unit in the first area of the display screen.

Further, when the terminal controls the second area to display the black picture, the terminal turns off a light emitting unit in the second area of the display screen.

Further, the method further includes: controlling, by the terminal, the display frequency and a frequency of power-frequency current of the display screen to form a phase difference.

Further, the method further includes: when the first area displays the black picture and the image frame picture, the front-facing camera is in a working state; and the controlling, by the terminal, the front-facing camera to obtain a preview image includes: when the first area displays the black picture, reading, by the terminal, the preview image obtained by the front-facing camera.

An embodiment of this application further provides a terminal, including a processor, a memory, a display screen, and a front-facing camera. The front-facing camera is located under the display screen; a display area of the display screen includes a first area and a second area. The first area includes an area in which a lens of the front-facing camera is located, and the second area is at least a part of an area, other than the first area, in the display area. The memory and the display screen are coupled to the processor. The memory is configured to store computer program code. The computer program code includes a computer instruction, and when the processor executes the computer instruction, the terminal is enabled to perform the photographing method.

For details provided in this embodiment of this application, for example, a position of the front-facing camera, display of the display screen, and working with the camera to perform exposure, refer to description in the foregoing embodiments. The ambient light sensor in the foregoing embodiments is replaced with the front-facing camera. Certainly, the terminal provided in this embodiment of this application may include both the front-facing camera and the ambient light sensor that are located under the screen, or may include all the front-facing camera, the ambient light sensor, and the optical proximity sensor that are located under the screen.

The foregoing description about implementations allows a person skilled in the art to understand that, for ease of description and brevity, division of the foregoing functional modules is used as an example for description. In an actual application, the foregoing functions can be allocated to different modules and implemented according to a requirement. In other words, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An ambient light detecting method, comprising:
at a first moment, displaying, by a terminal, a black picture in a first area of a display screen of the terminal and an image frame picture in a second area of the display screen, wherein the terminal includes a first ambient light sensor under the display screen, the display screen includes the first area and the second area, the first ambient light sensor receives ambient light through the first area, and the second area is outside the first area, and wherein the black picture is displayed for at least two times in the first area during refreshing of one frame of the image frame picture;

at a second moment, displaying, by the terminal, the image frame picture in the first area and the black picture in the second area;

detecting, by the first ambient light sensor of the terminal, an intensity of the ambient light during a duration of the black picture being displayed in the first area or during a duration of the image frame picture being displayed in the first area; and using, by the terminal, the intensity of the ambient light detected by the first ambient light sensor during the duration of the black picture being displayed in the first area, not the intensity of the ambient light detected during the duration of the image frame picture being displayed in the first area.

2. The method according to claim 1, further comprising:
displaying, by the terminal, the black picture periodically in the first area, wherein the black picture continuously moves from one boundary of the display area to an opposite boundary of the display area on the display screen during refreshing of the image frame picture.

3. The method according to claim 2, wherein a display frequency of the terminal is f Hz, and an interval between consecutively displaying, in the first area controlled by the terminal, the black picture for the at least two times is equal to 1/(a*f) seconds, wherein a is a positive integer greater than or equal to 2.

4. The method according to claim 1, wherein a duration of displaying the black picture is a first duration, a duration of detecting the ambient light by the first ambient light sensor is a second duration, and the first duration is greater than or equal to the second duration.

5. The method according to claim 1, wherein the image frame picture includes a display user interface presented by the terminal to a user.

6. The method according to claim 1, wherein the method further comprises:
displaying, by the terminal, the black picture for a plurality of times in the second area;
displaying, by the terminal, the image frame picture in the first area when the black picture is displayed in the second area; and
displaying, by the terminal, the image frame picture in the second area in an interval between displaying the black picture in the second area for two times.

7. The method according to claim 6, wherein the terminal further comprises a second ambient light sensor configured to receive ambient light through the second area, and the method further comprises:
obtaining, by the terminal, a second intensity of the ambient light, wherein the second intensity of the ambient light is detected by the second ambient light sensor when the second area displays the black picture.

8. The method according to claim 1, wherein the first ambient light sensor is located in an edge portion of the display screen.

9. The method according to claim 1, wherein before determining the intensity of the ambient light for the terminal, the method further comprises:
obtaining, by the terminal, the intensity of the ambient light which is detected by the first ambient light sensor during the duration of the black picture being displayed in the first area.

10. An ambient light detecting method, comprising:
displaying, by a terminal, a black picture for at least two times in a first area of a display screen, wherein the terminal includes a first ambient light sensor under the display screen, the display screen includes the first area and a second area, the first ambient light sensor receives ambient light through the first area, and the second area is outside the first area, and wherein the black picture is displayed for at least two times in the first area during refreshing of one frame of an image frame picture;

displaying, by the terminal, the image frame picture in the second area when the black picture is displayed in the first area;

displaying, by the terminal, the image frame picture in the first area in an interval between displaying the black picture in the first area for two times, wherein a duration of displaying one black picture is less than a duration of displaying one image frame picture;

detecting, by the first ambient light sensor of the terminal, an intensity of the ambient light during a duration of the black picture being displayed in the first area or during a duration of the image frame picture being displayed in the first area; and using, by the terminal, the intensity of the ambient light detected by the first ambient light sensor during the duration of the black picture being displayed in the first area, not the intensity of the ambient light detected during the duration of the image frame picture being displayed in the first area.

11. The method according to claim 10, wherein the displaying, by the terminal, the black picture for at least two times in the first area of the display screen comprises:
displaying, by the terminal, the black picture periodically in the first area, wherein the black picture continuously moves from one boundary of the display area to an opposite boundary of the display area on the display screen during refreshing of the image frame.

12. The method according to claim 10, wherein a display frequency of the terminal is f Hz, and an interval between consecutively displaying, in the first area controlled by the terminal, the black picture for the at least two times is equal to 1/(a*f) seconds, wherein a is a positive integer greater than or equal to 2.

13. The method according to claim 10, wherein the duration of displaying the black picture each time is a first duration, a duration of detecting the ambient light by the first ambient light sensor is a second duration, and the first duration is greater than or equal to the second duration.

14. The method according to claim 10, wherein the image frame picture includes a display user interface presented by the terminal to a user.

15. The method according to claim 10, wherein the first ambient light sensor is located in an edge portion of the display screen.

16. The method according to claim 10, wherein before determining the intensity of the ambient light for the terminal, the method further comprises:
obtaining, by the terminal, the intensity of the ambient light which is detected by the first ambient light sensor during the duration of the black picture being displayed in the first area.

17. The method according to claim 16, wherein after obtaining, by the terminal, the intensity of the ambient light which is detected by the first ambient light sensor, the method further comprises:
adjusting, by the terminal, luminance of the display screen based on the intensity of the ambient light detected by the first ambient light sensor during the duration of the black picture being displayed in the first area.

18. A device, comprising:

one or more processors;

one or more memories;

a display screen including a first area and a second area, wherein the second area is outside the first area; and a first ambient light sensor under the display screen configured to receive ambient light through the first area;

wherein the one or more memories are configured to store one or more programs that, when executed by the one or more processors, cause the device to:

display a black picture for at least two times in a first area of a display screen, wherein the first ambient light sensor receives ambient light through the first area and the black picture is displayed for at least two times in the first area during refreshing of one frame of an image frame picture;

display the image frame picture in the second area when the black picture is displayed in the first area;

display the image frame picture in the first area in an interval between displaying the black picture in the first area for two times, wherein a duration of displaying one black picture is less than a duration of displaying one image frame picture;

detect an intensity of the ambient light during a duration of the black picture being displayed in the first area or during a duration of the image frame picture being displayed in the first area; and use the intensity of the ambient light detected by the first ambient light sensor during the duration of the black picture being displayed in the first area, not the intensity of the ambient light detected during the duration of the image frame picture being displayed in the first area.

19. The device according to claim 18, wherein before wherein before determining the intensity of the ambient light for the terminal, the device is further caused to:

obtain, the intensity of the ambient light which is detected by the first ambient light sensor during the duration of the black picture being displayed in the first area.

20. The device according to claim 19, wherein after obtaining the intensity of the ambient light which is detected by the first ambient light sensor, the device is further caused to:

adjust luminance of the display screen based on the intensity of the ambient light detected by the first ambient light sensor during the duration of the black picture being displayed in the first area.

* * * * *

UNITED STATES PATENT AND TRADEMARK OFFICE
CERTIFICATE OF CORRECTION

PATENT NO. : 11,705,039 B2  
APPLICATION NO. : 17/678330  
DATED : July 18, 2023  
INVENTOR(S) : Li et al.

Page 1 of 1

It is certified that error appears in the above-identified patent and that said Letters Patent is hereby corrected as shown below:

On the Title Page

Applicant Item (71):
"Honor Device Co., Ltd., Guangdong (CN)"
Should read:
-- Honor Device Co., Ltd., Shenzhen (CN) --.

Signed and Sealed this
Twenty-second Day of August, 2023

Katherine Kelly Vidal
*Director of the United States Patent and Trademark Office*